US007689458B2

(12) United States Patent
Heckerman et al.

(10) Patent No.: US 7,689,458 B2
(45) Date of Patent: Mar. 30, 2010

(54) SYSTEMS AND METHODS FOR DETERMINING BID VALUE FOR CONTENT ITEMS TO BE PLACED ON A RENDERED PAGE

(75) Inventors: David E. Heckerman, Bellevue, WA (US); David M. Chickering, Bellevue, WA (US); Christopher A. Meek, Kirkland, WA (US); Brian Burdick, Bellevue, WA (US); Li Li, Issaquah, WA (US); Murali Vajjiravel, Sammamish, WA (US); Ying Li, Bellevue, WA (US); Rajeev Prasad, Kirkland, WA (US); Raxit A. Kagalwala, Issaquah, WA (US); Tarek Najm, Kirkland, WA (US); Sachin Dhawan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 10/977,824

(22) Filed: Oct. 29, 2004

(65) Prior Publication Data
US 2006/0095336 A1    May 4, 2006

(51) Int. Cl.
G06Q 30/00    (2006.01)
(52) U.S. Cl. .................... 705/14.46; 705/1; 705/14; 705/26; 705/27

(58) Field of Classification Search ............... 705/26, 705/27, 1, 14
See application file for complete search history.

(56) References Cited

U.S. PATENT DOCUMENTS

| 2003/0014331 A1* | 1/2003 | Simons ................ 705/27 |
| 2003/0033292 A1* | 2/2003 | Meisel et al. ............. 707/3 |
| 2004/0186778 A1* | 9/2004 | Margiloff et al. ........ 705/14 |
| 2005/0171844 A1* | 8/2005 | Ferber et al. ............ 705/14 |
| 2007/0174114 A1* | 7/2007 | Bigby et al. ............ 705/14 |

OTHER PUBLICATIONS

"Can Ads Keep Fueling Google? Internet-Search Firm's IPO Comes Amid Uncertainty About Key Revenue Source" Kevin J. Delaney. Asian Wall Street Journal. Victoria, Hong Kong: Apr. 30, 2004, p. M.89. Retrieved via ProQuest on Dec. 13, 2009.*

* cited by examiner

*Primary Examiner*—Jeffrey A. Smith
*Assistant Examiner*—Michael A. Misiaszek
(74) *Attorney, Agent, or Firm*—Shook, Hardy & Bacon LLP

(57) ABSTRACT

Systems and methods for determining the value of bids placed by content providers for placement positions on a page, e.g., a web page, rendered according to a given context, for instance, the search results listing for a particular query initiated on a search engine web site, are provided. Additionally, systems and methods are provided for determining placement of content items, e.g., advertisements and/or images, on a rendered page relative to other content items on the page based upon bid value.

17 Claims, 22 Drawing Sheets

SYSTEMS AND METHODS FOR DETERMINING BID VALUE FOR CONTENT ITEMS TO BE PLACED ON A RENDERED PAGE

CROSS-REFERENCE TO RELATED APPLICATIONS

Not applicable

STATEMENT REGARDING FEDERALLY SPONSORED RESEARCH OR DEVELOPMENT

Not applicable.

TECHNICAL FIELD

The present invention relates to computing environments. More particularly, the present invention relates to systems and methods for determining the value of bids placed by content providers for placement positions on a rendered page, e.g., a web page. Additionally, the present invention relates to systems and methods for determining the placement of content items, e.g., advertisements and/or images, on a rendered page relative to other content items on the page.

BACKGROUND OF THE INVENTION

Searching and choosing products and services through computer-based search engines has become increasingly prolific in recent years. As such, content providers, i.e., those companies and/or individuals desiring content specific to their product(s) or service(s) to be displayed as a result of a given search engine query, e.g., advertisers, have begun to understand the value that placement of content items, e.g., descriptors or advertisements of their products or services, as a result of a search engine query can have on their sales.

For instance, if a user accesses a hosting web site, e.g., a search engine web site, and appropriately inputs a query for "Hawaiian hotels", it is the user's desire to have a listing of hotels in Hawaii displayed as a result of the query. There are, however, numerous hotels in Hawaii and the order in which descriptors of these hotels are displayed as a result of the query can have a significant impact on whether or not the user will access information associated with a particular hotel, e.g., by selecting a particular content item or descriptor on the query results page which links the user to additional information about the associated hotel. For example, a user is more likely to access information associated with a hotel that is displayed in one of the top three positions in a vertical listing of hotel links that is displayed as a result of the query than to access the information associated with a hotel that appears at the bottom of the display list. As such, determining the order in which the various content items or descriptors appear in the displayed query results listing has become a task of great interest to search engine web sites and content providers alike, both of whom would like to maximize their revenue.

Typically, search engines permit content providers to bid for particular words and/or phrases, such words and/or phrases being referred to herein as "bid terms", as a way for determining the order in which content items or descriptors which provide links to the content providers' information will be displayed. Bids are typically made as cost-per-click (CPC) commitments. That is, the content provider bids a dollar amount it is willing to pay each time a user selects or clicks on a displayed content item (e.g., an advertisement or image) as a result of the search engine query and thus accesses the information associated therewith.

One method that search engines may use to determine placement of different content descriptors or advertisements is to simply rank by the CPC bid and give the best or most prominent placement to the content provider bidding the highest amount. For instance, Hotel A may "bid" or agree to pay the search engine $1.00 for each user that accesses its information as a result of appearing in the search results of a given query while Hotel B may "bid" or agree to pay the search engine $1.50 for each user that accesses its information upon appearing in the query results. In this instance, Hotel B would "win" the bid and, accordingly, its content descriptor would be placed in a more prominent position on the web page on which the results of a search initiated by a query that exactly or partially matches the bid terms are displayed. For instance, a descriptor of Hotel B may be displayed in the first position of a plurality of vertically aligned content item positions that are displayed as a result of the query.

One drawback to this approach, however, is that it does not take into account the probability that a user will access the information associated with the advertisement (or other content) and, accordingly, all of the risk resides with the search engine. For instance, in an extreme example, a content provider may place an inordinately large bid for an advertisement that has a click-through-rate (CTR) of zero. Such scenario would result in the advertisement being placed prominently on the web page as the result of an appropriate query with no charge to the content provider and, thus, no profit to the search engine.

Another method that search engines may use to determine the placement of content items as the result of a particular query is to take the product of the content-provider's CPC bid and the probability that a user will access the information associated with the advertisement (or other content item) and provide the most prominent placement to the content provider having the highest product. In this way, the search engine may minimize its risk with respect to the above-described scenario wherein click-through probability was not taken into account and, accordingly, can attempt to maximize its expected profit. However, the probability that a user will access the information associated with a particular content item or descriptor may be difficult to determine, particularly when the content provider lacks a history with the search engine that can be empirically evaluated.

Additionally, in either of the above-described placement scenarios, content providers are unable to view the bids that are being placed by their competitors. As such, the only way that they can determine how their bids compare to their competitors is by examining the position they are awarded on the search engine web site relative to other content providers as a result of an appropriate query.

Accordingly, a method for determining relative placement of content items as the result of a search engine query wherein risk to the search engine may be minimized while its profit may be maximized would be desirable. Further, it would be advantageous if the relative placement of content items could be altered as the search engine developed a history with the content providers that is capable of being empirically evaluated. Additionally, a system and method for permitting providers to view information regarding their bids relative to their competitors prior to the ultimate placement being determined would be advantageous.

BRIEF SUMMARY OF THE INVENTION

The present invention relates to systems and method for determining the placement of content items or descriptors, e.g., advertisements and/or images, on a rendered page (e.g., a web page) relative to other content items on the page, such systems and methods being based upon bid value. Accordingly, in one aspect, the present invention is directed to a computer-implemented method for determining bid values for content to be placed on a rendered page according to a given context, e.g., the search results listing for a particular query initiated on a search engine web site. The method includes receiving a plurality of bids each associated with a content item, at least one of the plurality of bids being based upon a pricing model that is different from a pricing model upon which at least one other of the plurality of bids is based, and determining a bid value for each of the plurality of bids. For example, contemplate a scenario wherein two bids are received. In one scenario, each of the bids may be based upon a single pricing model, the pricing model for the first bid being different from the pricing model of the second bid. In another example, the first bid may be based upon a combination of more than one pricing model while the second bid may be based upon a single pricing model, whether the same as one of the pricing models on which the first bid is based or different therefrom.

In one pricing models, i.e., a cost-per-click (CPC) pricing model, a bid value may be determined as a CPC bid multiplied by the click-through rate (CTR) of a content item (e.g., an advertisement or image). In another aspect, the present invention is directed to a computer-implemented method for estimating CTR for content items to be placed on a page (e.g., a web page) rendered in accordance with a given context, for instance, the search results for a particular query initiated on a search engine web site, the estimate being based, in part, upon observed data.

In yet another aspect, the present invention is directed to a computer-implemented method for determining relative placement of content items based upon bid value, the content items to be placed on a page (e.g., a web page) rendered according to a given context. The method includes receiving a plurality of bids, each associated with a content item, and determining relative placement of the content items on the page according to Vickrey-like or modified Vickrey-like auction principles.

In another embodiment, the present invention is directed to a computer-implemented method for introducing randomness into the relative placement of content items based upon bid value, the content items to be placed on a page (e.g., a web page) rendered according to a given context. In one embodiment of the present invention, randomness is introduced by permitting each content provider placing a bid on a particular placement position on the rendered page to have its content item allocated to that particular placement position at a frequency proportional to the expected performance of its content item relative to the expected performance of the content items of all content providers placing bids for the same position.

In still another embodiment, the present invention is directed to a computer-implemented method for determining bid values based upon one or more targeting attributes for which a bidder (e.g., a content provider) may desire to place an incrementally different bid. The method permits a bidder to allocate a "base bid" for a basic good and then incrementally adjust the base bid for each attribute that it perceives as being of increased or decreased value. Subsequently, at the time an auction for the good is run, the total for each bidder's base bid and all of the incremental values which hold true regarding the good's attributes may be summed and a bid value determined.

In another embodiment, the present invention is directed to a computer-implemented method for determining the relative placement of content items of varying shapes and sizes based upon bid value, the content items to be placed on a page (e.g., a web page) rendered according to a given context. The method permits content providers to bid for mixed or bundled content items positions if, e.g., the content item desired to be placed on the rendered page does not fit within the parameters of a single defined content item position.

In yet another embodiment, the present invention is directed to a computer-implemented method for estimating the relative placement position of a particular content item based upon a proposed bid and displaying such position estimate to a content provider. Further, the present invention is directed to a computer-implemented method for estimating the value a content provider would have to bid to have a high likelihood of having its content item placed in a desired content item position and displaying the bid value/pricing estimate to the content provider.

BRIEF DESCRIPTION OF THE SEVERAL VIEWS OF THE DRAWING

The present invention is described in detail below with reference to the attached drawing figures, wherein:

FIG. 12 is an illustrative screen display of an exemplary user interface (UI) wherein a base bid may be entered or selected by a bidder and displayed in accordance with an embodiment of the present invention;

FIG. 13 is an illustrative screen display of an exemplary user interface (UI) having an expanded advanced price calculator options area relative to the screen display of FIG. 12;

FIG. 15 is an illustrative screen display of an exemplary user interface (UI) wherein desired position and frequency information may be entered or selected by a bidder and displayed in accordance with an embodiment of the present invention;

FIG. 16 is an illustrative screen display of an exemplary user interface (UI) having an expanded advanced price calculator options area relative to the screen display of FIG. 15;

DETAILED DESCRIPTION OF THE INVENTION

The present invention provides systems and methods for determining the placement of content items or descriptors, e.g., advertisements and/or images, on a rendered page (e.g., a web page) relative to other content items on the page. Additionally, the present invention provides systems and methods for determining relative placement of content items on a rendered page based upon bid value, the bid values being determined based upon a plurality of pricing models. The present invention further provides systems and methods for estimating click-through-rates for content items to be placed on a rendered page based, in part, upon observed data. Still further, the present invention provides systems and methods for introducing randomness into the relative placement of content items based upon bid value. Additionally, the present invention provides systems and methods for determining bid values based upon one or more targeting attributes for which a bidder may desire to place an incrementally different bid. Further, the present invention provides systems and methods for determining the relative placement of content items of varying shapes and sizes based upon bid value. The present invention further provides systems and methods for estimating the relative placement position of a particular content item based upon a proposed bid and displaying such position estimate to a content provider. Additionally, the present invention provides systems and methods for estimating the value a content provider would have to bid to have a high likelihood of having its content item placed in a desired content item position and displaying the bid value/pricing estimate to the content provider.

Having briefly described an overview of various embodiments of the present invention, an exemplary operating environment for the present invention is described below.

Exemplary Operating Environment

Figure 1:
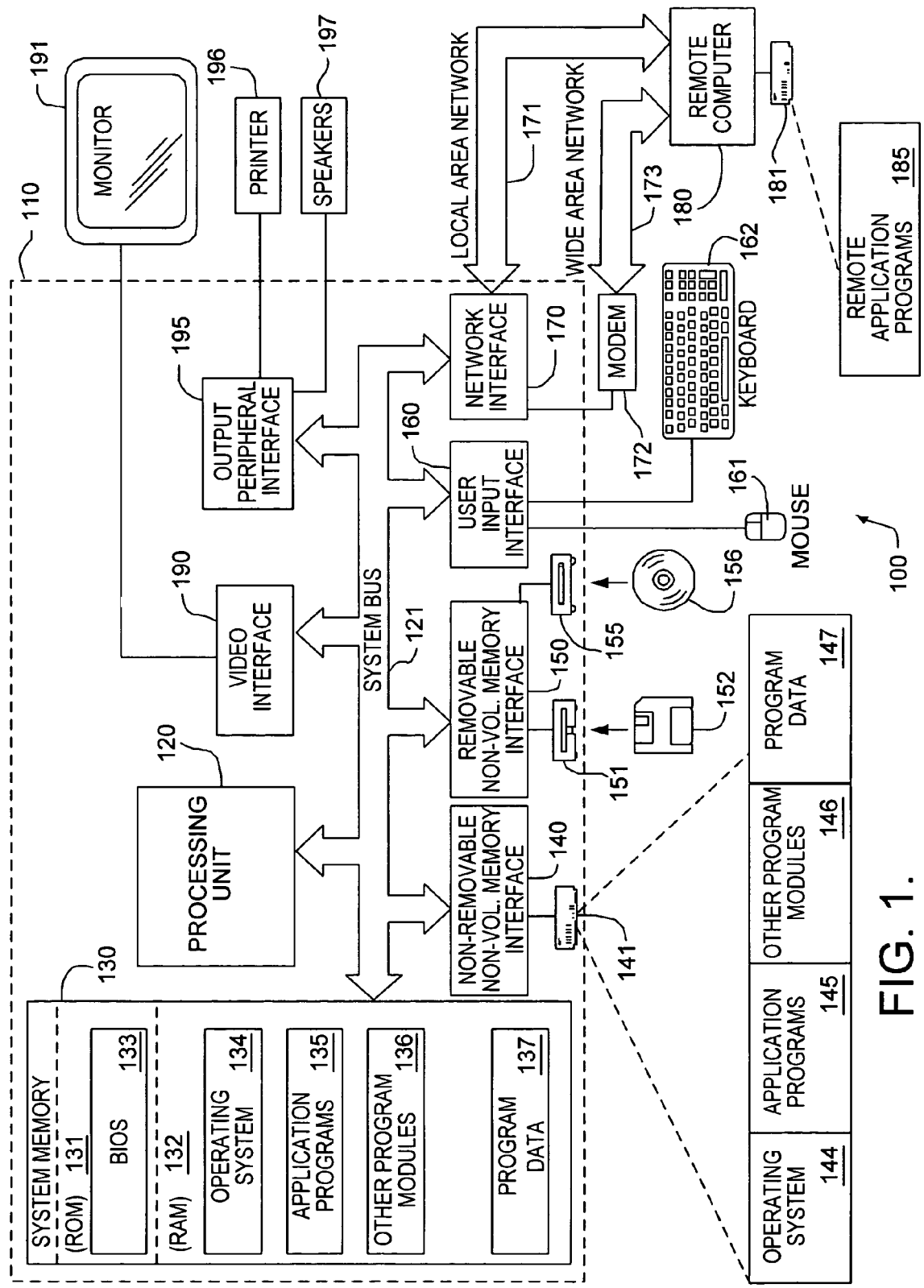
FIG. 1 is a block diagram of an exemplary computing environment suitable for use in implementing the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded into the RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

Method for Determining Bid Values Based Upon a Plurality of Pricing Models

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As previously mentioned, the present invention relates to systems and methods for determining the value of bids placed by content providers for placement positions on a rendered page, e.g., a web page. As bid value may be measured in terms of dollars paid to the hosting web site, e.g., a search engine web site, there are various different pricing models that can be mixed together in a principled manner to rank content items according to value.

One such pricing model is referred to herein as a "cost-per-impression" pricing model or a CPI model (also referred to as a "cost-per-thousand" or CPM model). In the CPI pricing model, a content provider, e.g., an advertiser, pays the search engine a fixed dollar amount each and every time its content item, e.g., its advertisement or image, is displayed as the result of an appropriate search engine query. The advertisers' bids in this pricing model are equivalent to their value and, accordingly, there is no uncertainty involved in calculating the bid value.

A second pricing model is referred to herein as a "cost-per-click" pricing model or a CPC model. In the CPC model, the content provider pays the search engine a fixed dollar amount each time a user accesses the information associated with the content item displayed as the result of an appropriate search engine query. That is, as content items typically represent selectable links to more detailed information about the subject matter thereof, in the CPC model, the content provider pays the search engine only when a user selects or clicks on its content item, thus accessing the associated information. The bid value in this pricing model is the CPC bid multiplied by the click-through-rate (CTR) of the content item (e.g., the advertisement or image). Click-through-rate is an unknown value and, accordingly, it must be estimated. Various methods for estimating CTR may be utilized, a number of which are discussed hereinbelow.

The uncertainty in this scenario rests on the search engine because if the content item is displayed in a prominent position as the result of an appropriate query but no users access the information associated with the item, the search engine receives no payment from the content provider.

A third pricing model is referred to herein as a "cost-per-sale" pricing model or a CPS model. In the CPS model, the content provider bids a fixed dollar amount it is willing to pay the search engine for each sale that results from a user being shown its content item as the result of an appropriate search engine query. In this scenario, the search engine receives payment from the content provider only if a user purchases the product or service indicated by the content item and not if someone merely accesses the information associated with the content item but does not complete the sale. The bid value in this case is the CPS bid multiplied by the expected probability that showing the advertisement will result in a sale. The expected sales probability must be estimated, the ease with which this may be done being based largely upon the history between the content provider and the search engine.

A fourth pricing model is referred to herein as a "revenue sharing" model. With revenue sharing, the content provider bids a percentage of the sales price that they are willing to pay to the search engine if a user buys anything as a result of being shown the content item in the results of an appropriate search engine query, whether or not the product or service sold is identical to the product or service associated with the content item. The bid value is calculated in this instance as the revenue sharing percentage bid, e.g., 5%, multiplied by the expected sales price. There is some tracking involved in the revenue sharing pricing model, the ease with which such tracking may be done being based upon the history between the content provider and the search engine, as well as the breadth of products and/or services offered by the content provider.

The above-described pricing models all have one feature in common: they can be evaluated based upon a dollar figure. That is, the search engine may determine a bid value for each content provider which may subsequently be compared with the bid values determined for competing content providers, regardless of which pricing model each content provider utilized in formulating its bid. For instance, if content provider A provides the search engine with a CPI bid and content provider B provides the search engine with a CPS bid, the search engine can determine the bid value for each of the bids received and, thus, appropriately compare the bids. In this way, the search engine can more adequately maximize its expected revenue. Additionally, as the search engine's expected revenue can be estimated and/or determined as a dollar amount, combinations of pricing models with respect to a single content provider may also be utilized, as more fully described below.

Figure 2:
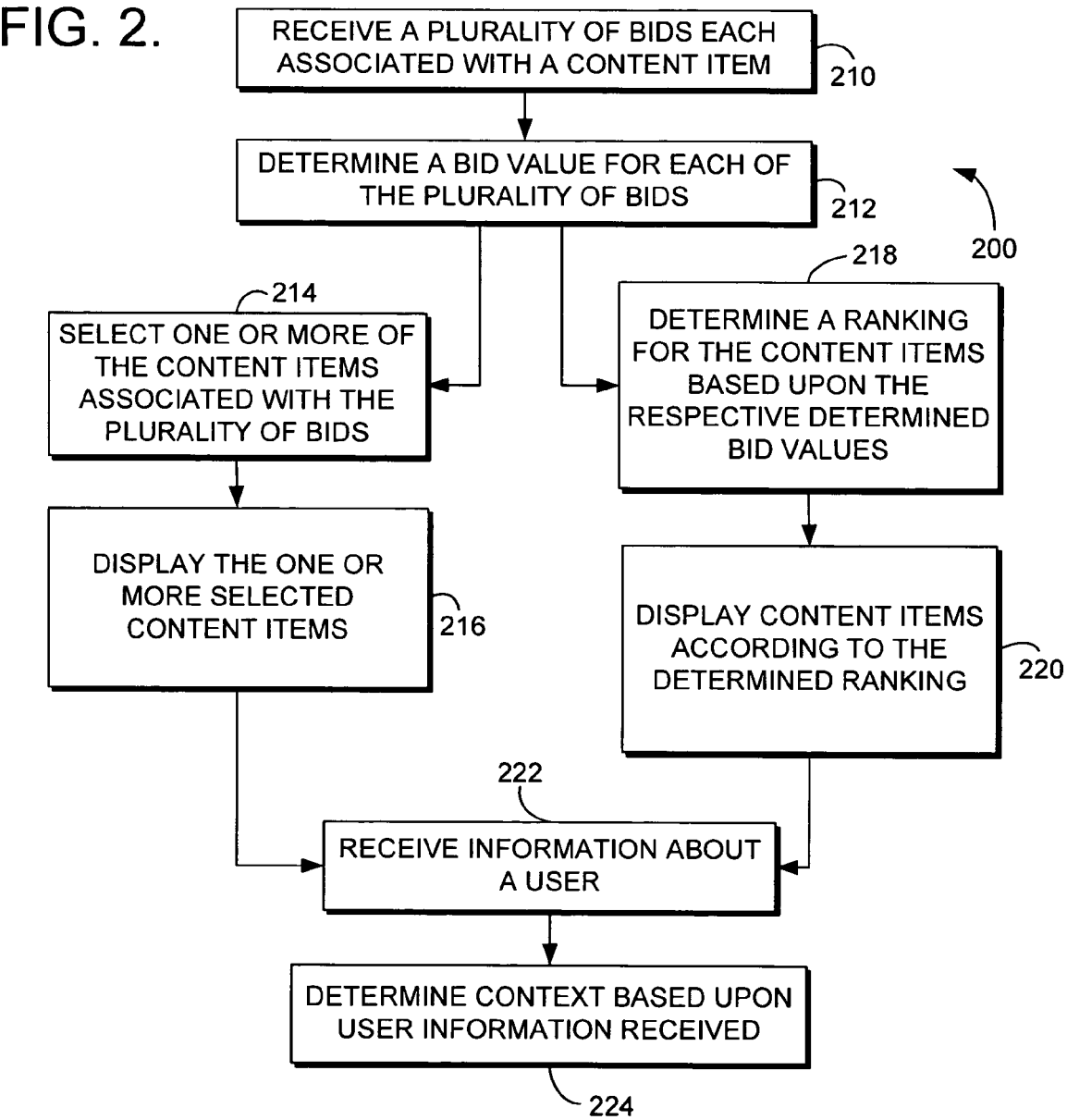
FIG. 2 is a flow diagram showing a computer-implemented method for determining bid values for content items (e.g., advertisements or images) in accordance with an embodiment of the present invention.

With reference to FIG. 2, a flow diagram is illustrated which shows a computer-implemented method 200 for determining bid values for content items (e.g., advertisements or images) in accordance with an embodiment of the present invention. The content items in method 200 may be placed on a page (e.g., a web page) rendered according to a given context, for instance, the search results for a particular query initiated on a search engine web site. Initially, as shown at block 210, the system receives a plurality of bids each associated with a content item, at least one of the plurality of bids being based upon a pricing model that is different from the pricing model upon which at least one other of the plurality of bids is based. These bids may be, for instance, based upon CPI bids, CPC bids, CPS bids, or revenue sharing bids, each of which was hereinabove described. It will be understood by those of ordinary skill in the art, however, that bids may be placed based upon a combination of pricing models and such combinations are intended to be included in the definition of such term. For instance, a bidder may place a bid for $0.05 per impression and $0.10 per occasion that an impression is clicked through. Such variations are intended to be within the scope of the present invention.

Depending upon the type of bid received, the system subsequently determines a bid value for each bid received, as shown at block 212. As each of the pricing models excepting the CPI pricing model includes some type of estimated probability in determining the bid value, in one embodiment, the system may only accept CPI bids from a content provider until enough user access data can be collected to determine a reliable CTR estimate, as more fully described below. Once a reliable CTR estimate may be determined, the content provider may "graduate" such that the system accepts CPC bids from it. Similarly, as more user access data is collected so that it may more confidently be predicted what the expected sales rate and/or the expected sales revenue for a given content provider may be, the content provider may "graduate" such that the system accepts CPS and/or revenue sharing bids from the content provider. All such variations are contemplated to be within the scope of the present invention.

In another embodiment, the system may accept non-CPI bids from all content providers but adjust the bid according to risk. One method for adjusting the bid is to add a "risk penalty" to the bids placed by content providers with which the search engine has little or no history. The more uncertain the search engine is about a CTR or sale probability, the larger the risk penalty. The risk penalty may be used to compute an effective CTR, which may then be used in determining expected bid value.

One risk penalty methodology which may be utilized determines an effective probability equal to the expected or estimated probability less an amount proportional to the variance of the estimate of the probability. The variance of the estimate of the probability, in turn, may be estimated via one of a set of standard probability models, e.g., the Dirichlet model, as known to those of ordinary skill in the art. Note that when no data is available to estimate the probabilities, the effective probability can go below zero, in which case a CPC bid may be ignored.

By way of example only, suppose a content provider desires to place a CPC bid and that a Beta(1,1) prior is used for the probability of a user clicking on the content item associated therewith. After the system evaluates user behavior and determines c clicks (i.e., c occasions wherein a user accesses the information associated with the content item) and n non-clicks (i.e., n occasions wherein a user does not access the information associated with the content item), the posterior probability of a user clicking is a Beta(1+c, 1+n) distribution. The expected click rate (i.e., the expected value of the Beta distribution) is accordingly:

$$E(\text{rate})=(1+c)/(2+c+n).$$

The variance of the click rate (i.e., the variance of the Beta distribution) is $$\text{Var}(\text{rate})=(1+c)(1+n)/[(2+c+n)^2(3+c+n)].$$

The effective click-through rate (CTR) may then be determined as $$P_{click}=E(\text{rate})-k\times\text{Var}(\text{rate})$$

for some value of k that determines how risk averse the content provider is. In practice, a prior may be selected that adequately reflects CTRs, for example, a Beta prior with small sample size (e.g., 1) and a mean equal to the overall CTR or sales rate of the content provider site. The risk-adjusted expected revenue for a bid and, in turn, the bid value, is the CPC bid price multiplied by the effective click-through rate, $P_{click}$.

Similarly, an effective click-through to sale, $P_{sale}$, may be determined and utilized for computation of the risk-adjusted expected revenue for CPS bids.

It should be noted that the above-described risk adjustment methodology is intended to be exemplary only. Any number of risk adjustment methodologies may be utilized, as known to those of ordinary skill in the art, and all such methodologies are intended to be within the scope of the present invention. For instance, risk adjustment could be calculated based upon the probability that the content provider will default on their payment, or the like.

In another embodiment, risk may be adjusted based upon a "risk bonus" to favor those content providers for whom CTRs are not well known, that is, those content providers with whom the search engine has limited history. In this instance, $$P_{click}=E(\text{rate})+k\times\text{Var}(\text{rate}).$$

Both the risk penalty and risk bonus embodiments of the present invention may be augmented to include a bid floor for the minimum bid for showing a content item using the expected revenue in the simple case and using risk adjusted expected revenue in the second case. Additionally, bid terms may be accepted which include locality specific terms, including, but not limited to, zip code or the like, as more fully described below. All such variations are contemplated to be within the scope hereof.

Referring back to FIG. 2, once the bid values have been determined, one or more of the content items associated with the plurality of bids may be selected based upon the respective determined bid values, for instance, for placement in a prominent position on the rendered page. This is shown at block 214. Typically, the content item having the highest bid value will be awarded the most prominent position upon display. For instance, contemplate a scenario wherein the positions available for placing content items are ordered as $pos_1, pos_2, pos_3, \ldots pos_k$, with $pos_1$ being the top link of a vertical listing of links on a search engine web page that is displayed as the result of a particular user query, $pos_2$ being the second link, and so on. In this instance, the content item having the highest bid value may be awarded $pos_1$.

Subsequently, the one or more selected content items may be displayed, as indicated at block 216. Alternatively or in conjunction, as shown at block 218, a ranking for the content items associated with the plurality of bids may be determined based upon the respective determined bid values. The selected content items may subsequently be displayed according to the determined ranking, as indicated at block 220.

Next, as indicated at block 222, the system may receive information about a user, e.g., demographic and/or gender-related information and the context may be determined based upon the user information received. This is indicated at block 224. Systems and methods for utilizing user information to determine bid value are more fully described below.

Methods for Estimating Click-Through Rates of Content Items on a Rendered Page

As previously discussed, one pricing model under which bid values may be determined is a cost-per-click pricing model or CPC pricing model. A bid value under this pricing model may be determined as the CPC bid multiplied by the click-through-rate (CTR) of the content item (e.g., the advertisement or image). Click-through-rate is an unknown value and, accordingly it must be estimated. As one of ordinary skill in the art will appreciate, appropriately estimating click-through rate (CTR) is important to ensure appropriate bid value calculations and, e.g., the resultant relative content item placement on a rendered page. Accordingly, the present invention further relates to systems and methods for estimating CTR for content items to be placed on a page (e.g., a web page) rendered according to a given context, for instance, the search results for a particular query initiated on a search engine web site.

Certain content item positions on a rendered page (e.g., a web page) have higher CTRs than other content item positions. For example, a user is more likely to access the information associated with a content item that is displayed in one of the top three positions in a vertical listing of content items (i.e., a user is more likely to "click-through" on a content item that is displayed in one of the top three positions in a vertical listing of content items) than to access the information associated with a content item that appears at the bottom of the display list. As such, in order to appropriately compare CPC bids for a content item that may appear in any one of a plurality of content item positions on the rendered page, historical CTR data must be adjusted such that the CTR for a more prominent or desired position is comparable to the CTR for a less prominent or desired position. Otherwise, content providers having better placement on the rendered page will be initially unfairly favored.

Figure 3A:
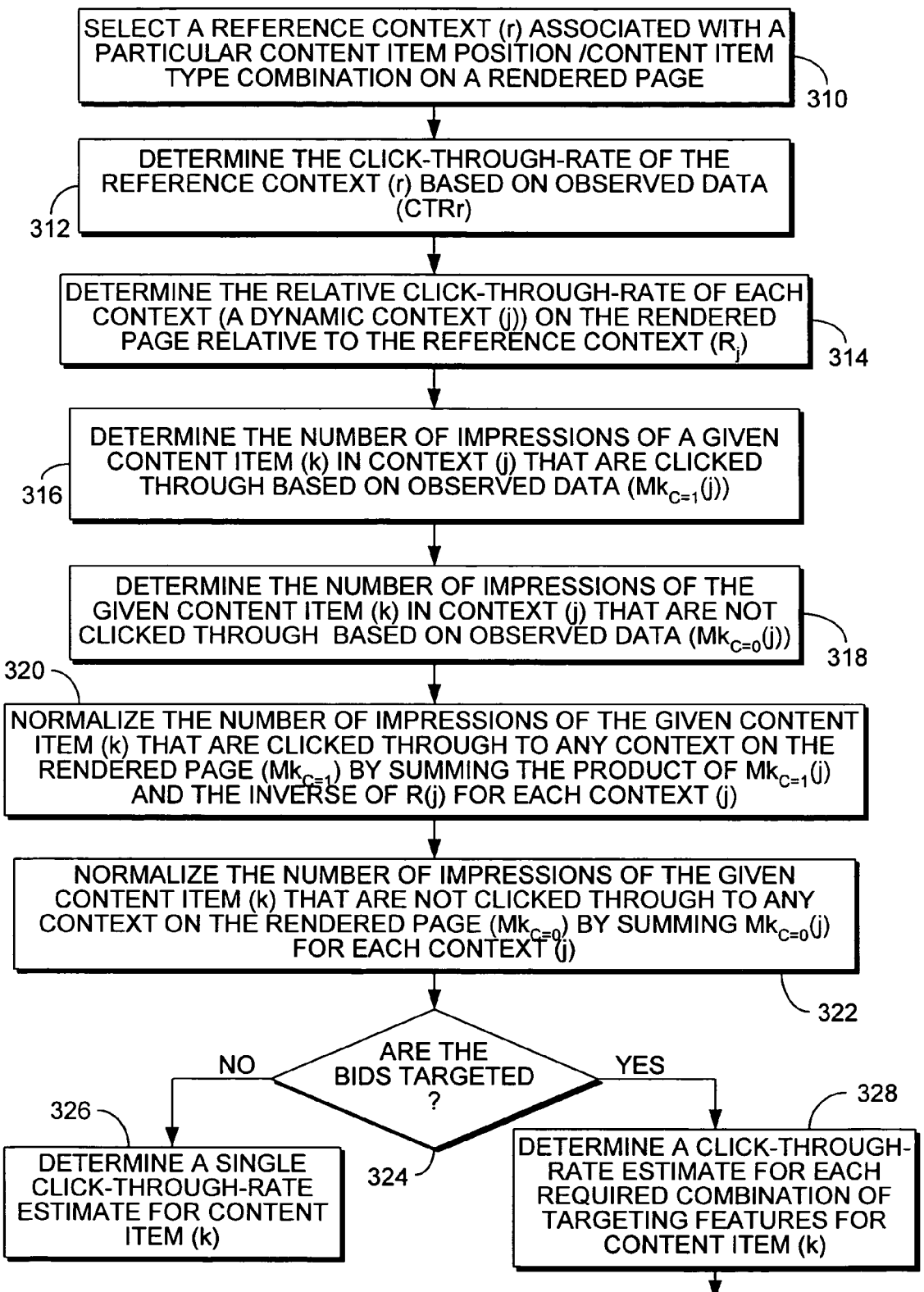
FIGS. 3A and 3B are flow diagrams showing computer-implemented methods for normalizing and estimating, respectively, click-through-rates (CTR) in accordance with embodiments of the present invention.

In adjusting or "normalizing" CTR, both the position of the content item on the rendered page as well as its content item type (e.g., mainline or sidebar) must be considered. The combination of these two variables is referred to herein as "context". Referring now to FIG. 3A, a computer-implemented method for normalizing click-through-rate such that context may be eliminated as a variable in CPC bid comparisons is shown and designated generally as reference numeral 300. Initially, as indicated at block 310, a particular context may be selected as a reference context (r), the reference context being associated with a particular content item position/content item type combination. The selected reference context need not have the highest CTR of the content items on the rendered page, however, it is currently preferred that the reference context be one of the contexts with a high CTR (e.g., a position 1 side-bar) in order to ensure good CTR estimates.

Subsequently, as indicated at block 312, the CTR of the reference context (r) may be determined based upon observed data ($CTR_r$). The CTR of each context on the rendered page (represented herein as a dynamic context (j)) relative to the CTR of the reference context (i.e., $CTR_r$) may then be determined and delineated as $R_j$. This is indicated at block 314.

For example, contemplate that it is desired to determine the CTR of a particular context (i) relative to the reference context and that the reference context, in this example, has a CTR represented by $CTR_1$ and given a value equal to one. $R_i$ (that is, the relative CTR of particular context (i) relative to $CTR_1$) may be represented as $CTR_i/CTR_1$. Thus, a content item is one-half as likely to be clicked in particular context (i) than in the reference context, $R_i=\frac{1}{2}$. (Note that $R_1$ (that is the CTR of the reference context ($CTR_1$) relative to the CTR of the reference context ($CTR_1$) will always be equal to one.)

In one embodiment, the range of permitted values for $R_i$ is [1/100, 20]. That is, if the maximum value is exceeded, then $R_i$ may be set to be equal to 20. Similarly, if $R_i$ is less than the minimum value, then it may be set to be equal to 1/100. If the reference context is selected appropriately (i.e., is selected as one of the contexts on the rendered page having one of the highest CTRs), then $R_i$ should not reach values that are very large and certainly should not approach the maximum value.

Returning to FIG. 3A, the actual number of impressions of a particular content item (k) in context (j) that are clicked through subsequently may be determined based on observed data and designated as $Mk_{C=1}(j)$. This is indicated at block 316. Additionally, as indicated at block 318, the actual number of impressions of the given content item (k) in context (j) that are not clicked through may also be determined based upon observed data and designated as $Mk_{C=0}(j)$.

Subsequently, as indicated at block 320, the number of impressions of the given content item (k) that are clicked through may be normalized to any context on the rendered page, the normalized number of impressions be designated as $Mk_{C=1}$. $Mk_{C=1}$ may be determined based upon the following formula:

$$Mk_{C=1} = \sum_j \frac{Mk_{C=1}(j)}{R_j}$$

Next, as indicated at block 322, the number of impressions of the given content item (k) that are not clicked through may be normalized to any context on the rendered page, the normalized number of impressions being designated as $Mk_{C=0}$. $Mk_{C=0}$ may be determined based upon the following formula:

$$Mk_{C=0} = \sum_j Mk_{C=0}(j)$$

(Note: Mk, the actual number of impressions normalized to any context on the rendered page, is equal to $Mk_{C=0}+Mk_{C=1}$.)

Subsequently, as indicated at block 324, it is determined whether or not the bid (or bids) for which it is desired that CTR be normalized are targeted or non-targeted bids. (Methods and systems for targeting bids based upon various attributes and attribute options are more fully described hereinbelow.) If it is determined that the bid for which it is desired that CTR be normalized is a non-targeted bid, a single CTR estimate for content item (k) may be determined based upon the following formula:

$$p_k(\text{click}) = \frac{Mk_{C=1}}{Mk_{C=1} + Mk_{C=0}}.$$

This is indicated at block 326. Click-through-rate may be stored at content item level thus enabling optimization of content items for ranking and display.

If the bid (or bids) for which it is desired that CTR be normalized are targeted bids, however, multiple estimates for CTR may be determined, one CTR for each required combination of targeting features. This is indicated at block 328. Being able to adjust CTR by targeting is useful as it makes CTRs based upon content items having different targeting features comparable. For instance, a CTR under a broad match query is likely to be lower than the CTR under an exact match query. If CTR is adjusted, broad match content providers may potentially be forced to pay higher CPC because of their lower CTR.

Determining an estimated CTR for bids based on one or more targeted features is more complicated than with non-targeted bids as it requires knowledge of a number of items that are not necessary for a non-targeting bid. First, the impact of each targeting feature on the CTR must be known. For instance, for a given content item, how much more likely is a New York user to click on it than a Seattle user? Secondly, the adjusted CTR must be dynamically calculated at run-time according to, in part, the search user's profile. For example, when it is known that the user is a New York user, the CTR must be adjusted with the New York effect at run-time, whereas if the search user is not from New York, the CTR may be adjusted with the New York effect set to zero.

For at least these reasons, an offline model is necessary to answer the first inquiry (i.e., the impact of each targeting feature on the CTR) and a real-time formula is necessary to answer the second inquiry (i.e., the search user profile).

The offline model makes sure that the impact of every possible value of the targeting attributes on CTR is known. That is, it will be known, for instance, that a female user is x % more likely to click on a particular content item, or a New York user is y % less likely to click on a content item than a user from any other demographic. Each possible value of the targeting attributes is referred to herein as a "feature". Therefore, Location=New York is a feature, as is Gender=Female.

Figure 3B:
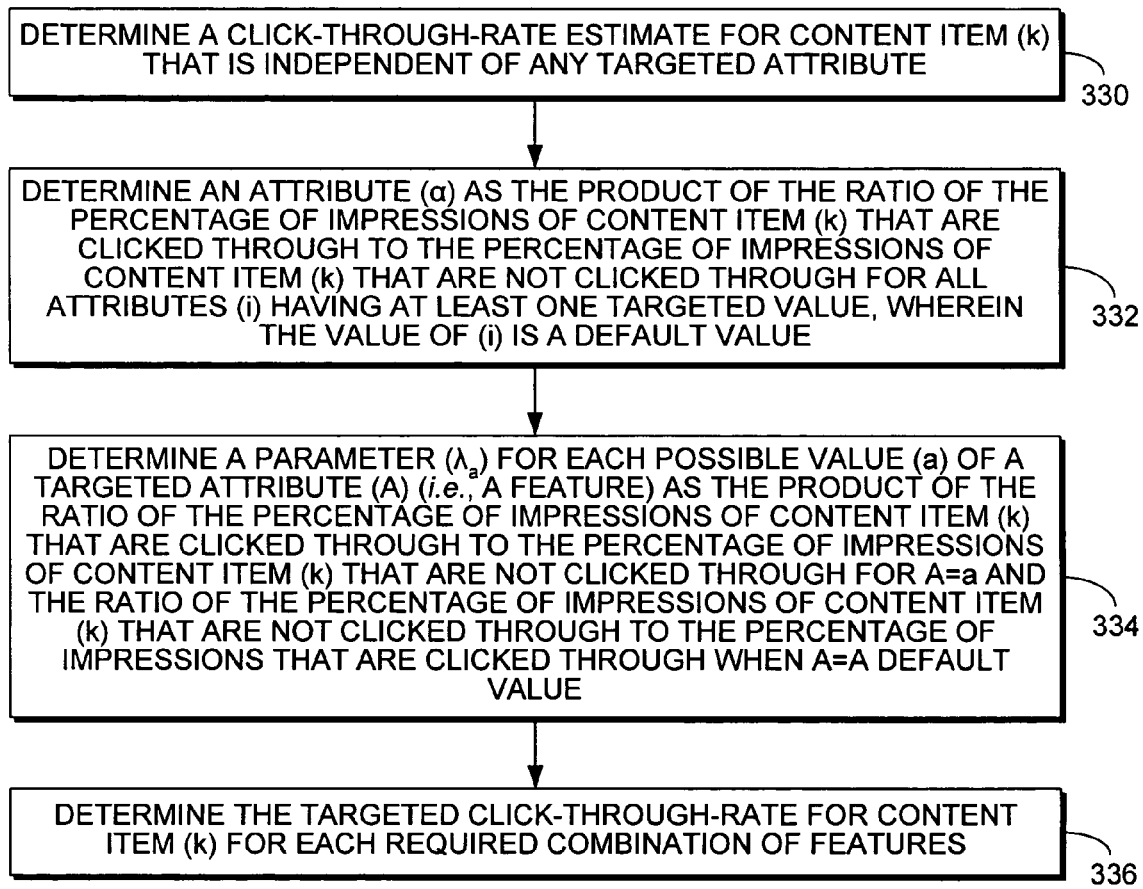

Referring now to FIG. 3B, a computer-implemented method for estimating click-through-rate when one or more bids is a targeted bid is illustrated. Initially, as indicated at block 330, the system estimates a CTR for content item that is independent of any targeted attribute. This estimate is determined by the same formula as the $P_k$(Click) under the non-targeting model discussed hereinabove.

Subsequently, as indicated at block 332, an attribute a is determined at the listing level using the following formula:

$$a = \prod_i \frac{p(A_i = default_i \mid \text{click})}{p(A_i = default_i \mid \text{noclick})}$$

wherein $default_i$ is the default value for attribute i, $P(A_i=default_i|\text{click})$ is the percentage of all impressions that are clicked through having $default_i$ (including those for which attribute i is unknown), $P(A_i=default_i|\text{noclick})$ is the percentage of all impressions that are not clicked through having the $default_i$ (including those for which attribute i is unknown), and the product is taken over all attributes that have at least one targeted value in the results listing.

Next, as indicated at block 334, a parameter ($\lambda_a$) for each possible value a of a targeted attribute A (i.e., a feature) is determined using the following formula:

$$\lambda_a = \frac{p(A = a \mid \text{click})}{p(A = a \mid \text{noclick})} \frac{p(A = default \mid noclick)}{p(A = default \mid \text{click})}$$

wherein the default value for attribute a is $default_a$, P(A=a|click) is the percentage of impressions having attribute A=a that are clicked through, P(A=a|noclick) is the percentage of all impressions having attribute A=a that are not clicked through, P(A=default|click) is the percentage of all impressions having $default_a$ that are clicked through (including those for which attribute A is unknown), and P(A=default|noclick) is the percentage of all impressions having $default_a$ that are not clicked through (including those for which attribute A is unknown).

To extract each parameter $\lambda_i$ contemplate that feature i corresponds to attribute A having value a. (Note that there will never be a feature or $\lambda$ corresponding to the default value of an attribute.)

Subsequently, as shown at block 336, the targeted CTR is determined for content item (k) for each combination of features using the following formula:

$$p(\text{Click on ad } k \mid \text{Features}) = \frac{\mu_k a \prod_i \lambda_i^{f_i}}{1 + \mu_k a \prod_i \lambda_i^{f_i}}$$

$$\text{where } \mu_k = \frac{p_k(\text{click})}{1 - p_k(\text{click})}.$$

The input feature, $f_i$, is a binary function that is equal to one if a given user has the attribute and value associated with parameter $\lambda_i$ and zero otherwise. The formula has one parameter $\lambda_i$ for each input feature $f_i$.

Initial values for the offline parameters for both the targeting and non-targeting models must be determined. In all cases p(A=i|no click)=P(A=i) and p(A=i|click)=p(A=i) may be initialized. Thus, all that remains is to find a good estimate for $p_k$(click). Using the same initial value for all content items in the results listing (i.e., $p_k$(click)=p(click) for all content items (k)), three cases are considered.

First, contemplate a scenario wherein content item (k) is for a new query term. That is, no content providers have previously bid on the term. In this scenario, p(click) may be set to the global click rate. Note that a bad estimate in this case is not a big deal as in all likelihood, there will not be any competition for this particular query term and, thus, a bid floor will likely be charged. The only way in which there may be competition for this particular query term is if two content providers both bid on the new query term at the same time. In this case, the CTR estimates will be the same for both content providers and the content provider providing the highest bid (which will also be the bid having the highest bid value) will be awarded the position being auctioned. Additionally, the winning content provider will be charged the bid provided by the competing content provider in accordance with Vickrey-type auction principles, as more fully described below.

Second, contemplate a scenario wherein the content item is for an old query term but the content provider is new. In this case, the median p(click) for the content providers who currently have content items displayed for the bid term will be used for the new content provider's estimated CTR.

Third, contemplate a scenario wherein the content item is for an old query term but the content provider has content items running for other query terms as well. This case is similar to the new content provider scenario, except that instead of using the median p(click), the relative CTRs for this particular content provider's other queries will be used to estimate CTR. If the content provider does better than average on other queries, it will be assumed that it will do better than average on this query as well.

In this scenario, the percentage of other content items for which this content provider has a p(click) greater than the median p(click) for the corresponding query term is first determined. If this percentage, K, is less than 50%, the initial probability will be set as in the new content provider scenario described hereinabove. If, however, K is greater than 50%, the initial probability will be set at the Kth percentile probability of current content providers. That is, if K=80% and there are 100 content items displayed in the query search results listing, the p(click) values will be sorted in descending order and the $20^{th}$ p(click) will be used. If this p(click) is greater than the second-highest p(click), however, the estimated CTR will be re-set to be equal to the second highest. This makes sure that a content provider never has the highest estimated p(click) until the system has actually started keeping track.

A batch updating method may be used to update the offline parameters for both the targeting and non-targeting models. In particular, after a data-gathering period, the parameters may be modified to better reflect the observed fractions in the data. The update is a function of counts in the observed data. That is, because $p_k$(click) is calculated per content item, impressions that are clicked through that are specific to a particular content item must be counted.

Let $Mk_{C=1}$ be the number of effective impressions of content item (k) in the data that are clicked-through impressions and let $Mk_{C=0}$ be the number of effective impressions of content item (k) in the data that are impressions that are not clicked through. Let $Mk=Mk_{C=0}+Mk_{C=1}$. Effective counts rather than actual counts are used to adjust for differences in click-through-rates for different contexts (i.e., positions and render types). The specific method for computing effective counts was described hereinabove.

The update formula is as follows:

$$p'_k(\text{click}) = \beta^{Mk} \times p_k(\text{click}) + (1-\beta^{Mk})\left(\frac{Mk_{C=1}+q}{Mk_{C=1}+Mk_{C=0}+s}\right)$$

where q and s are constants with q<s (e.g., q=p(click), the global probability of any content item on the rendered page being clicked, and s=1). The denominator and numerator of the second part of the formula add only a small number (1 and q) such that $P'_k$(click) is not equal to zero.

Because the conditional probabilities are shared across all content items in a search results listing, impressions and click-throughs are counted for the listing without regard to the content item itself. In this way, p(A=a|click) may be updated.

Let N be the total number of (actual) impressions of all content items on the results listing. Let $N_{c=1}$ be the number of impressions in the data that are clicked through, and let $N_{c=0}$ be the number of impressions in the data that are not clicked through. Similarly, let $N_{A_i=j, C=1}$ be the number of impressions where attribute i has value j and there is click through, and let $N_{A_i=j, C=0}$ be the number of impressions where attribute i has value j and there is no click through. The parameters subsequently may be updated as follows:

$$p'(A_i = j \mid \text{click}) =$$
$$\gamma^{N_{C=1}} \times p(A_i = j \mid \text{click}) + (1-\gamma^{N_{C=1}})\left(\frac{N_{A_i=j,C=1}+w_{ij}}{N_{C=1}+x_{ij}}\right) \text{ and}$$

$$p'(A_i = j \mid \text{noclick}) =$$
$$\gamma^{N_{C=0}} \times p(A_i = j \mid \text{noclick}) + (1-\gamma^{N_{C=0}})\left(\frac{N_{A_i=j,C=0}+w_{ij}}{N_{C=0}+x_{ij}}\right)$$

where $w_{ij}$ and $x_{ij}$ are constants with $w_{ij}<x_{ij}$ (e.g., $w_{ij}$=p($A_i$=j), the global probability that attribute i has value j, and $x_{ij}$=1.

In a currently preferred embodiment, $\beta$=0.999 and $\gamma$=0.99 as these values work well for the on-line version of the update (i.e., when N=1).

Method for Determining Relative Placement of Content Items Using Vickrey-Type Auction Principles The present invention further relates to systems and methods for determining relative placement of content items based upon bid value, the content items to be placed on a page (e.g., a web page) rendered according to a given context, for instance, the results of a particular query run by a search engine. In one embodiment, the relative placement of the content items may be determined based upon bid values according to Vickrey-like auction principles. Vickrey-like auction principles are well known to those of ordinary skill in the art and, accordingly, are discussed only briefly herein. More detailed information about Vickrey-like auctions may be found in Milgrom, P., *Putting Auction Theory to Work* (Churchill Lectures in Economics); (Cambridge University Press; Jan. 12, 2004); ISBN 0521536723, the entirety of which is incorporated by reference herein.

In a standard Vickrey-like auction, there are a number of items available for auction and a number of bidders who desire to bid on one or more of the items. The bids for each item are received and the auction items are then allocated to the bidders. In one embodiment, the present invention relates to applying Vickrey-like auction principles to determine relative placement of content items on a rendered page.

Figure 4:
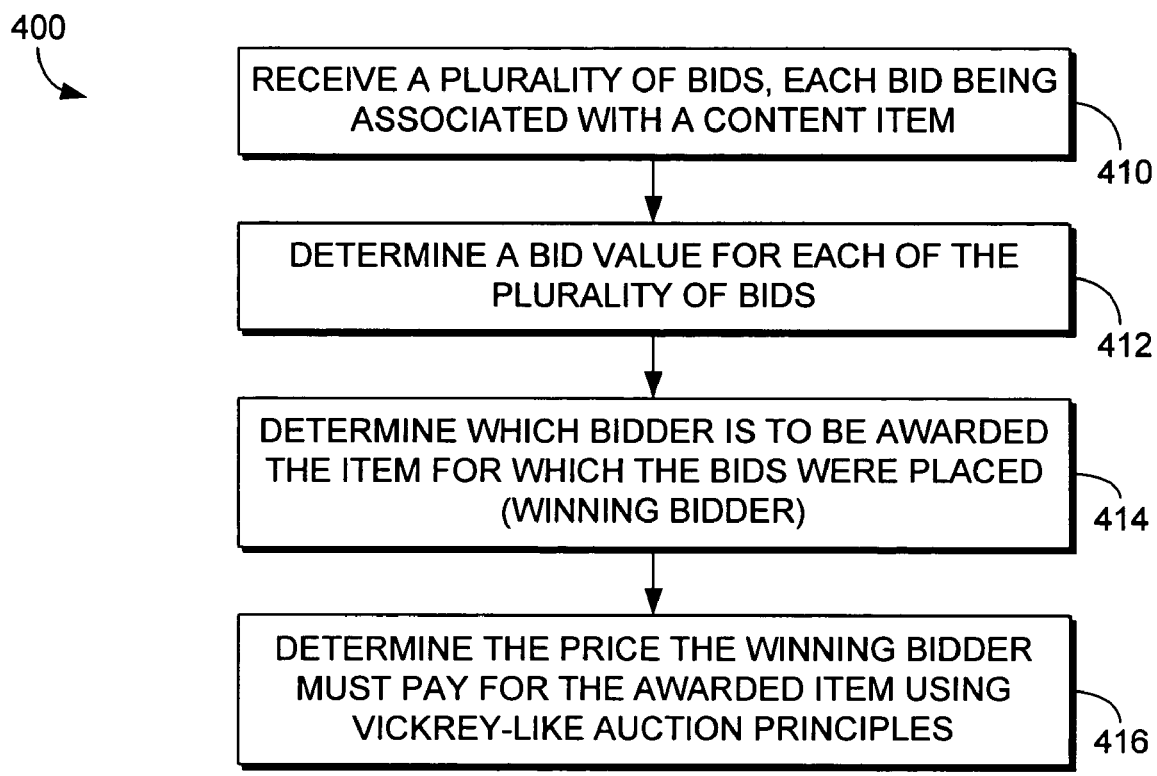
FIG. 4 is a flow diagram showing a computer-implemented method for using Vickrey-like auction principles to determine relative placement of content items on a rendered page in accordance with an embodiment of the present invention.

With reference to FIG. 4, a flow diagram is illustrated which shows a computer-implemented method 400 for using Vickrey-like auction principles to determine relative placement of content items on a rendered page in accordance with an embodiment of the present invention. The content items in method 400 may be placed on a page (e.g., a web page) rendered according to a given context, for instance, the search results listing for a particular query initiated on a search engine web site.

Initially, as shown at block 410, the system receives a plurality of bids for a particular item, e.g., a particular content item position, available for auction, each bid being associated with a content item. For instance, recall the scenario described hereinabove wherein a plurality of content providers are bidding for placement of their content on a rendered page relative to the content of other content providers, all such content falling within the given context. The "items" available for auction in this scenario may be thought of the various positions on the results page of a particular query run by a search engine. By way of example only, the positions available to the content providers may be ordered as $pos_1$, $pos_2$, . . . , $pos_k$, with $pos_1$ being the top-most position on the rendered page, $pos_2$ being the second position from the top of the rendered page, and so on. Accordingly, bids may be received from a number of content providers for each position and, regardless of the pricing model under which a bid was provided, a bid value may be determined for each of the bids for each position. This is shown at block 412.

Subsequently, it may be determined which bidder is to be awarded the item for which the bids were placed, i.e., the winning bidder, as indicated at block 414. For instance, the positions on the page may then be awarded to the content providers such that the total value is maximized.

By way of example, suppose there are three positions on a rendered page to be allocated and five content providers (A, B, C, D, and E) place bids on the positions. Irrespective of the type of bid received (e.g., a CPI bid, a CPC bid, a CPS bid, or a revenue sharing bid), suppose the bid values for $pos_1$ for the content providers are as follows: content provider A's bid has a bid value of $1.00, content provider B's bid has a bid value of $0.90, content provider C's bid has a bid value of $0.80, content provider D's bid has a bid value of $0.75, and content provider E's bid has a bid value of $0.60. As content provider A's bid has the highest bid value, content provider A will be awarded $pos_1$. All other positions on the rendered page will be similarly allocated among those content providers bidding therefore, keeping in mind that in some instances, there will be constraints within the auction that need to be satisfied. For example, each bidder may be permitted to be awarded only a single item in the auction. Suppose in this example that content providers B and C are awarded the other two positions available for auction on the rendered page.

Figure 5:
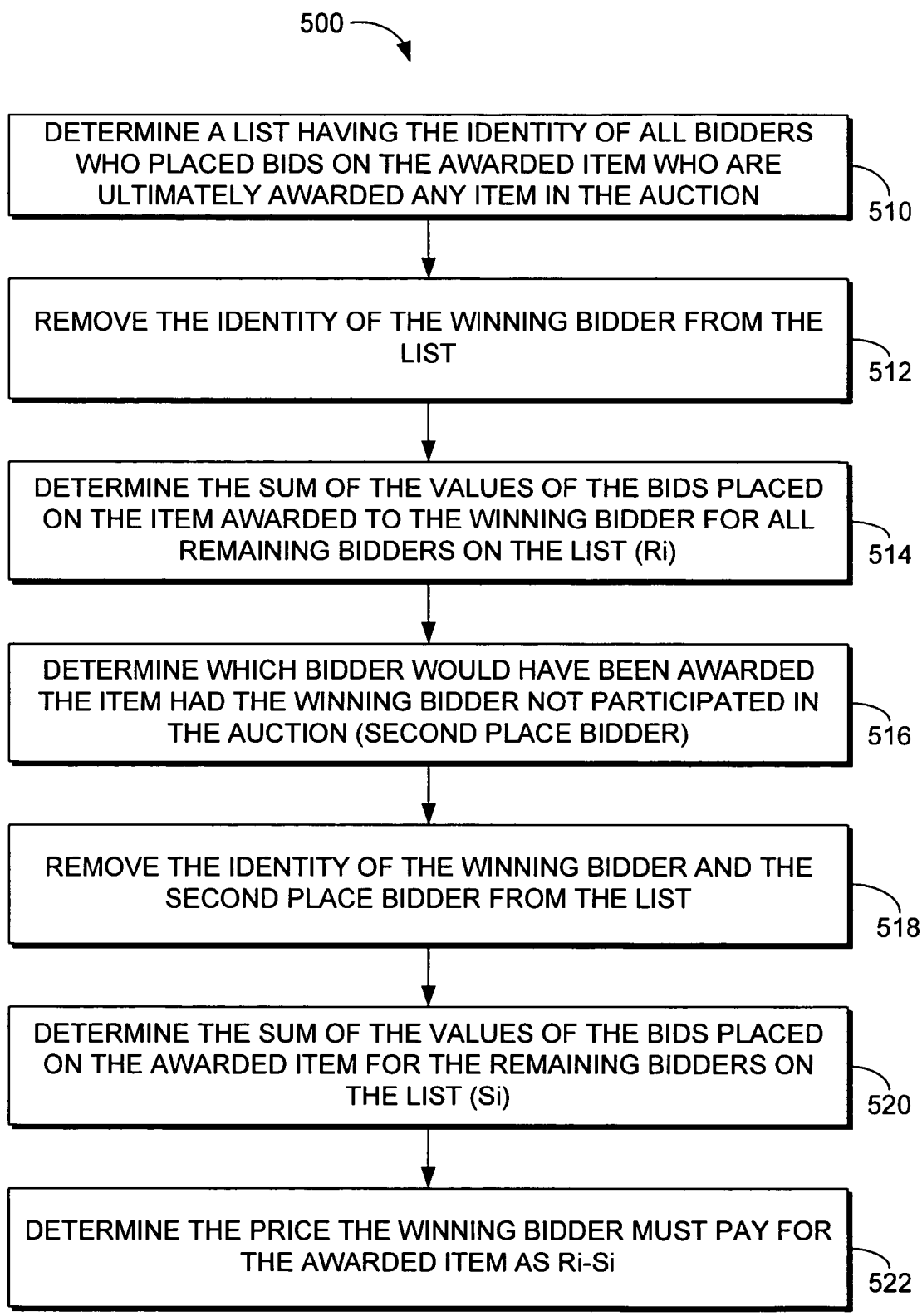
FIG. 5 is a flow diagram showing a computer-implemented method for determining the price a winning bidder must pay for being awarded an item using Vickrey-like auction principles in accordance with an embodiment of the present invention.

Once the allocation of items is determined, the price the winning bidder must pay for the item awarded is determined, as indicated at block 416. In a Vickrey-like auctions, the winning bidder typically pays for an item the value that the bidder took away from the other winning bidders as a result of their participation in the auction. With reference to FIG. 5, a computer-implemented method for determining the price the winning bidder must pay for the awarded item using Vickrey-like auction principles in accordance with an embodiment of the present invention is illustrated and designated generally as reference numeral 500. Initially, as shown at block 510, the system determines the identify of all bidders who placed bids on the awarded item who are ultimately awarded any item in the auction and generates a list thereof. That is, if bidder i is awarded a particular item in the auction, a list of all bidders who bid on the item awarded to bidder i is generated. (Note that the value for all the bidders who are not awarded an item in the auction will be zero.)

Subsequently, as shown at block 512, the identity of the winning bidder is removed from the list (i.e., the identity of bidder i is removed from the list). Next, as shown at block 514, the system determines the sum of the values of the bids for all other bidders in the auction who bid on the item awarded to the winning bidder, that is, the sum of the values of the bids for the awarded items for all bidders whose identity remains on the list. This value is designated Ri.

Subsequently, the scenario is again evaluated, this time from a perspective as if the winning bidder had not participated in the auction for the awarded item, i.e., as if bidder i had not placed a bid on the item it was ultimately awarded. This is shown at block 516. Next, the list generated at block 510 is recalled by the system and the identity of the winning bidder (i.e., bidder i) and the second place bidder (i.e., the bidder who would have been the winning bidder had bidder i not participated in the auction) are removed from the list. This is shown at block 518. Subsequently, the sum of the values of the bids for all other bidders in the auction who bid on the item awarded to the winning bidder, that is, the sum of the values of the bids for the awarded item for all bidders whose identity remains on the list, is determined, as shown at block 520. This value is designated Si.

For instance, in the above-described scenario, if content provider A had not participated in the auction, content provider B would have been awarded $pos_1$ and thus, the sum of all other bidders who are awarded any item in the auction (in this case only content provider C) may be determined according to the altered allocation, the sum being denoted by $S_i$.

Subsequently, the price the winning bidder must pay for the awarded item is determined as Ri minus Si, as indicated at block 522. Accordingly, in the above-described scenario, content provider A will be charged a price for $pos_1$ equal to the value taken away from content providers B and C. $R_i$ in this scenario may be determined to be equal to $0.90 (the value of content provider B's bid) plus $0.80 (the value of content provider C's bid), or $1.70. Additionally, if content provider A was removed from the determination and content provider B was awarded $pos_1$, Si (or the sum of the bid values for all other bidders who placed a bid on $pos_1$ and who were ultimately awarded any item in the auction, in this case only content provider C) may be determined to be equal to $0.80. Thus, content provider A will be charged $R_i$ ($1.70) less $S_i$ ($0.80) or $0.90 for placement in $pos_1$.

Note that in this scenario, the price that a bidder will be charged for being awarded an item generally will be the value of the second highest bid received for the item. In this instance, content provider A pays for $pos_1$ the bid value of content provider B's bid (the second highest bid value received for $pos_1$) or $0.90.

In certain circumstances, for instance when a large number of bidders are placing bids for a large number of items in a single auction, the general Vickrey-like auction as described above can be somewhat difficult to solve in real time. This is, in part, due to the need to separately determine the allocation of items and the price for each bidder who is awarded an item in the auction. In such circumstances, it may be desirable to run a "modified" Vickrey-like auction. For a modified Vickrey-like auction, contemplate that the items being auctioned may be provided in an order of decreasing desirability. For instance, in the above-described scenario, contemplate that the ordering of $pos_1, pos_2, \ldots pos_k$ is given in decreasing order of desirability. That is, if a content provider bids on position i and on position j, then i<j implies that the content provider values position i over position j. As such, relative placement may be determined such that for each position in the order, a single-item Vickrey-like auction is performed, and the winner simply removed from the equation for consideration of subsequently determined positions.

In the modified Vickrey-like auction described herein, each bidder is permitted to place only a single bid and designate such bid for one or more items available for auction. A bid value may then be determined for each bid received and the auction items may be allocated to the bidders in such a way that the total value is maximized. Accordingly, the value of each bidder's bid determines, e.g., which position on the rendered page it will be awarded. Thus, e.g., the content provider providing the bid with the highest bid value will be awarded the most prominent placement (pos, in the above-described scenario), the content provider providing the bid with the second highest bid value will be awarded the second most prominent placement ($pos_2$ in the above-described scenario), and so on. Note that the bid values to be awarded each content provider's bid may be determined, e.g., as previously set forth according to one or more of the cost-per-impression, cost-per-click, cost-per-sale, and/or revenue sharing pricing models.

By way of example only, contemplate that content provider A places a bid having a value of $1.00 and designates such bid for any of $pos_1, pos_2,$ or $pos_3$; content provider B places a bid having a value of $0.90 and designates such bid for any of $pos_1, pos_2,$ or $pos_3$; content provider C places a bid having a value of $0.80 and designates such bid for any of $pos_1$ or $pos_2$ content provider D places a bid having a value of $0.75 and designates such bid for any of $pos_1, pos_2,$ or $pos_3$; and content provider E places a bid having a value of $0.60 and designates such bid for any of $pos_1, pos_2,$ or $pos_3$.

With respect to $pos_1$, content provider A will be awarded the position as content provider A placed the bid having the highest bid value for $pos_1$. Content provider A will pay for $pos_1$ the value of the second highest bid for $pos_1$ or $0.90 (content provider B's bid for $pos_1$).

Subsequently, with respect to $pos_2$, content provider A again provided the bid having the highest bid value as its $1.00 bid was designated for any of $pos_1, pos_2,$ or $pos_3$. However, in the modified Vickrey-like auction of the present invention, it will be assumed that content provider A values $pos_1$ over $pos_2$ (as 1<2) and, thus, as content provider A has already been awarded $pos_1$, it will be removed from consideration for subsequently determined positions. If content provider A is removed from consideration, of the remaining content providers, B, C, D and E all placed bids for pos2. Content provider B will be awarded $pos_2$ as it provided the bid having the highest bid value (excluding content provider A) and content provider B will pay for $pos_2$, the second highest bid value placed for $pos_2$ (excluding content provider A) or $0.80 (the value of content provider C's bid for $pos_2$).

Subsequently, with respect to $pos_3$, content provider A again provided the bid having the highest bid value as its $1.00 bid was designated for any of $pos_1$, $pos_2$, or $pos_3$. However, as content provider A has already been awarded a position, it will be removed from the consideration for determination of the content item placed in $pos_3$. Of the remaining content providers, content provider B provided the bid having the highest bid value for $pos_2$ as its $0.90 bid was designated for any of $pos_1$, $pos_2$, or $pos_3$. However, content provider B has also already been awarded a position ($pos_2$), and, therefore, it will be removed from consideration for determination of the content item placed in $pos_3$ as well.

Of the remaining content providers, only content providers D and E placed bids for $pos_3$ (content provider C's bid being designated only for $pos_1$ or $pos_2$). As such, content provider D will be awarded $pos_3$ (as its bid for $pos_3$ is the highest of the remaining content providers being considered for $pos_3$) and it will pay for $pos_3$ the second highest bid value placed for $pos_3$ (excluding content providers A and B) or $0.60 (the value of content provider E's bid for $pos_3$).

In yet another embodiment of the present invention, a content provider may be permitted to specify a different bid for each item on which it desires to place a bid and the allocation and pricing of the items determined according to the modified Vickrey-like auction principles hereinabove described. For instance, again contemplate the above-described scenario wherein content providers A, B, C, D, and E are bidding for placement of their content in $pos_1$, $pos_2$, and $pos_3$ on a rendered page. Further contemplate that content provider A places a bid having a value of $1.00 for $pos_1$ and a value of $0.49 for $pos_2$, content provider B places a bid having a value of $0.90 for $pos_1$ and a bid having a value of $0.50 for $pos_2$, and content provider C places a bid having a value of $0.75 for $pos_1$ and a bid having a value of $0.30 for $pos_2$, the remaining content providers and bids for $pos_3$ being irrelevant to the present example and, accordingly, not delineated herein.

With respect to $pos_1$, content provider A will be awarded the position as it placed the bid having the highest bid value for $pos_1$ ($1.00) and will pay for $pos_1$ the value of the second-highest bid for the position or $0.90 (content provider B's bid for $pos_1$). With respect to $pos_2$, content provider B will be awarded the position as it placed the bid having the highest bid value for $pos_2$ ($0.50). However, in determining the price that content provider B must pay for $pos_2$, content provider A's bid of $0.49 for $pos_2$ will be taken out of consideration for determination of the content item placed in $pos_2$. This is because under the modified Vickrey-like auction of this embodiment of the present invention, it is assumed that content provider A values $pos_1$ over $pos_2$ (as 1<2) and, as content provider A was already awarded $pos_1$, it will be taken out of the determination for $pos_2$. Thus, content provider B will pay for $pos_2$ the second highest bid value for $pos_2$ (excluding content provider A) or $0.30 (the value of content provider C's bid for $pos_2$).

Methods for Introducing Randomness into the Determination of the Relative Placement of Content Items on a Rendered Page In another embodiment, the present invention relates to systems and methods for introducing randomness into the relative placement of content items based upon bid value, the content items to be placed on a page (e.g., a web page) rendered according to a given context, for instance, the results of a particular query run by a search engine. In the relative placement scenarios described hereinabove, content items are ranked and selected for relative placement on a rendered page based solely upon the bid values determined for each content item. That is, the bid values determined for each content item are ranked in descending order and, if there are N positions on a rendered page available for placement of content items, the N content items having the highest bid values are selected and placed in the N positions on the page. The content item that has the highest bid value is placed in the most prominent or desired position, the content item that has the second highest bid value is placed in the second most prominent or desired position, and so on. The methodologies on which these scenarios are run are deterministic and will render the same result each and every time they are run from the same information.

Figure 6:
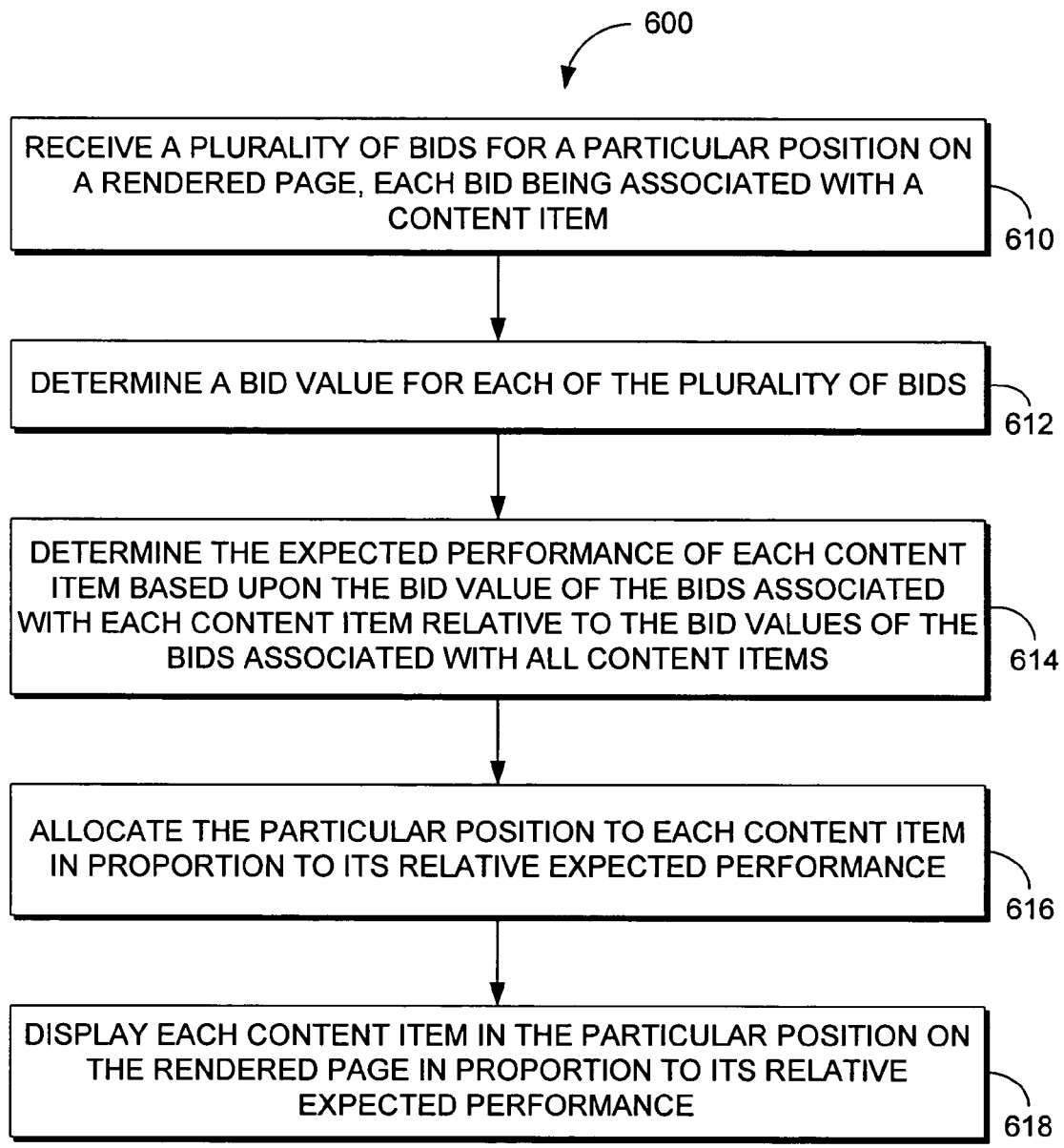
FIG. 6 is a flow diagram showing a computer-implemented method for introducing randomness into the relative placement allocation of content items on a rendered page in accordance with an embodiment of the present invention.

In one embodiment of the present invention, randomness is introduced into the deterministic scenarios hereinabove described by permitting each content provider placing a bid on a particular placement position on the rendered page, to have its content item allocated to that particular placement position at a frequency proportional to the expected performance of its content item relative to the expected performance of the content items of all content providers placing bids for the same position. With reference to FIG. 6, a flow diagram is illustrated which shows a computer-implemented method 600 for introducing randomness into the relative placement allocation of content items in accordance with this embodiment of the present invention.

Initially, as shown at block 610, the system receives a plurality of bids for a particular position on a rendered page, each bid being associated with a content item. Subsequently, a bid value is determined for each of the plurality of bids, as indicated at block 612.

For instance, contemplate the above-described scenario wherein a plurality of content providers are bidding for placement of their content items on a rendered page relative to the content items of other content providers and wherein the positions available to the content providers may be ordered as $pos_1, pos_2, \ldots, pos_k$, with $pos_1$ being the top-most position on the rendered page, $pos_2$ being the second position from the top of the rendered page, and so on. Further contemplate that four content providers, A, B, C, and D place bids for placement of their content item to be placed in $pos_1$, the bid value for content provider A's content item being equal to $5.00, the bid value for content provider B's content item being equal to $4.00, the bid value for content provider C's content item being equal to $3.00 and the bid value for content provider D's content item being equal to $2.00.

Subsequently, as indicated at block 614, the expected performance of each content item based upon the bid value associated therewith is determined relative to the bid values of the bids associated with all other content items for which bids were placed for placement in $pos_1$. That is, the relative expected performance of each content item, $REP_x$, is determined according to the following formula:

$$REP_X = \frac{(\text{Bid Value of Content Item } X)^\alpha}{\Sigma(\text{Bid Value of All Content Items Being Ranked})^\alpha}$$

the significance of the value of the a parameter being more fully described below.

Thus, returning to the above-described scenario, the relative expected performance of content item A, $REP_A$, (with $\alpha=1$) may be determined as:

$$REP_A = \frac{(\$5.00)^1}{(\$5.00 + \$4.00 + \$3.00 + \$2.00)^1} = 0.3571$$

The expected performance of content item A can therefore claim 35.71% of the total value among all content items bidding for placement in $pos_1$. Performing a similar calculation for each of content items B, C, and D, the relative expected performance of each may be determined such that content item B can claim 28.57% of the total value among all content items bidding for placement in $pos_1$, content item C can claim 21.43% of the total value, and content item D can claim 14.29% of the total value.

Subsequently, as shown at block 616, the particular position for which each content provider's bid was placed (i.e., $pos_1$) may be allocated to each of content items A, B, C, and D in proportion to their relative expected performance. That is, content item A will be awarded $pos_1$ 35.71% of the time, content item B will be awarded $pos_1$ 28.57% of the time, content item C will be awarded $pos_1$ 21.43% of the time and content item D will be awarded $pos_1$ 14.29% of the time, the awarding of $pos_1$ occurring proportionately in terms of frequency but completely at random.

One way in which the above-described allocation methodology may be thought of is to contemplate that lottery tickets are awarded to each of the bidder's items (e.g., content items) for which bids are placed on the particular auctioned item (e.g., $pos_1$), the number of lottery tickets awarded being based determined in proportion to their performance relative to other bidders placing bids for the same auctioned item (e.g., other content providers placing bids for placement in the same position on the rendered page), and a simulated random lottery drawing is performed to choose which bidder's item (e.g., content item) is awarded the auctioned item (e.g., $pos_1$). In the above-described scenario, the number of lottery tickets awarded and the relative performance of all content items in a lottery having 1,000 tickets may be determined as set forth in Table I.

TABLE I

| Content Provider/ Item | Bid Value | Expected Relative Performance | Number of Lottery Tickets |
| --- | --- | --- | --- |
| A | $5.00 | 35.71% | 357.1 |
| B | $4.00 | 28.57% | 285.7 |
| C | $3.00 | 21.43% | 217.3 |
| D | $2.00 | 14.29% | 142.9 |

In this example, each content item has been allocated a number of tickets proportional to their value relative to the whole. When a winning ticket is chosen randomly, content items A will have a 35.71% chance of being selected, content item B will have a 28.57% chance of being selected, content item C will have a 21.73% chance of being selected, and content item D will have a 14.29% chance of being selected. Subsequently, as shown at block 618, each of the content items may be displayed on the rendered page in proportion to its relative expected performance, the awarding of $pos_1$ occurring proportionately in terms of frequency but completely at random.

The $\alpha$ parameter permits control over how much "exploring" vs. how much "exploiting" is done. That is, as the a parameter increases in value, the lottery allocation becomes more skewed toward higher performing bidders (e.g., the content items of higher performing content provider's), making the lottery more like a standard rank with little or no randomization (i.e., "exploiting"). Conversely, lowering the value of the $\alpha$ parameter causes increased randomness, permitting lower-performing content items to be selected for display more frequently, thus giving them a chance to improve their standing (i.e., "exploring").

For instance, if an $\alpha$ parameter of three is applied to the relative expected performance equation in the above-described example wherein there are four content items A, B, C, and D having bid values of $5.00, $4.00, $3.00, and $2.00, respectively, the number of lottery tickets allotted to each of the content items would be as shown in Table II. Notice how content item A, the highest performer, is awarded a larger number of tickets than when the a parameter had a value of one. Thus, the higher value for the a parameter exploits the higher performers and, consequently, penalizes the lower performing content provider's items.

TABLE II

| Content Provider/ Item | Bid Value | Expected Relative Performance | Number of Lottery Tickets |
| --- | --- | --- | --- |
| A | $5.00 | 55.80% | 558.0 |
| B | $4.00 | 28.57% | 285.7 |
| C | $3.00 | 12.05% | 120.5 |
| D | $2.00 | 3.57% | 35.7 |

Introducing randomness into content ranking may seem counterintuitive. However, it makes sense in a scenario wherein the providers of content items (e.g., advertisements or images) are bidding for positions on a rendered page (e.g., a web page) for a number of reasons. First, in a standard ranking determination, if N placement positions are available on the rendered page, only the top N results will be displayed to the user. Content items not in the top N are either displayed on a subsequent search results page, or not displayed at all. This poses a problem when new content items enter the system since ranking is based on performance and there is no recorded performance for a new content provider. One way in which this problem may be countered when using a standard ranking determination is to give an artificial boost to new content providers or items, thereby ensuring that some performance is recorded. This solution is sub-optimal to the method of the present invention, however, since new content items are treated differently than long-running content items and content providers may be able to take advantage of this, perhaps unfairly.

A second reason that it makes sense to introduce randomness into a scenario wherein the providers of content items are bidding for positions on a rendered page is that one danger of standard ranking determination for search advertising is that smaller content providers (i.e., advertisers) may be pushed out by content providers who have larger marketing budgets or are willing to take loss-leading bids to push out competition. The method of the present invention wherein randomness is introduced into the determination avoids this problem by providing all content providers at least some inventory in a fair manner, that is, in proportion to their bid value. This should increase competition and stop bid prices from bottoming out.

Methods for Incremental Pricing of Items in an Auction Based Upon Delineated Attributes In another embodiment, the present invention relates to systems and methods for determining bid values based upon one or more targeting attributes for which a bidder (e.g., a content provider) may desire to place an incrementally different bid. Auctions often include a large number of basic goods that are similar but not exact. That is, the basic goods may contain a high number of variable attributes which make them incrementally different from other similar goods. In such situations, a bidder may wish to place a higher or lower bid on goods having one or more particular attributes than on similar goods that are void of such attributes. Accordingly, the method of this embodiment of the present invention permits a bidder to allocate a "base bid" for each basic good and then incrementally adjust the base bid for each attribute that it perceives as being of increased or decreased value. At the time the auction is run for each good, the total for each bidder's base bid and all of the incremental values which hold true regarding the good's attributes may be summed and the bid value determined.

This embodiment of the present invention may be particularly useful for business-to-business marketplaces in which thousands of similar but not exact goods change hands on a regular basis. In a currently preferred embodiment, targeting criteria with respect to search engine users placing queries for particular content items and/or the relative placement thereof may be differentially priced separately from the base bids for the search terms themselves. However, it will be understood and appreciated by those of ordinary skill in the art that the method of this embodiment of the present invention also may be used for other goods in which there may be a basic rate and add-on options, e.g., bicycles, machine parts, or automobiles.

Figure 7:
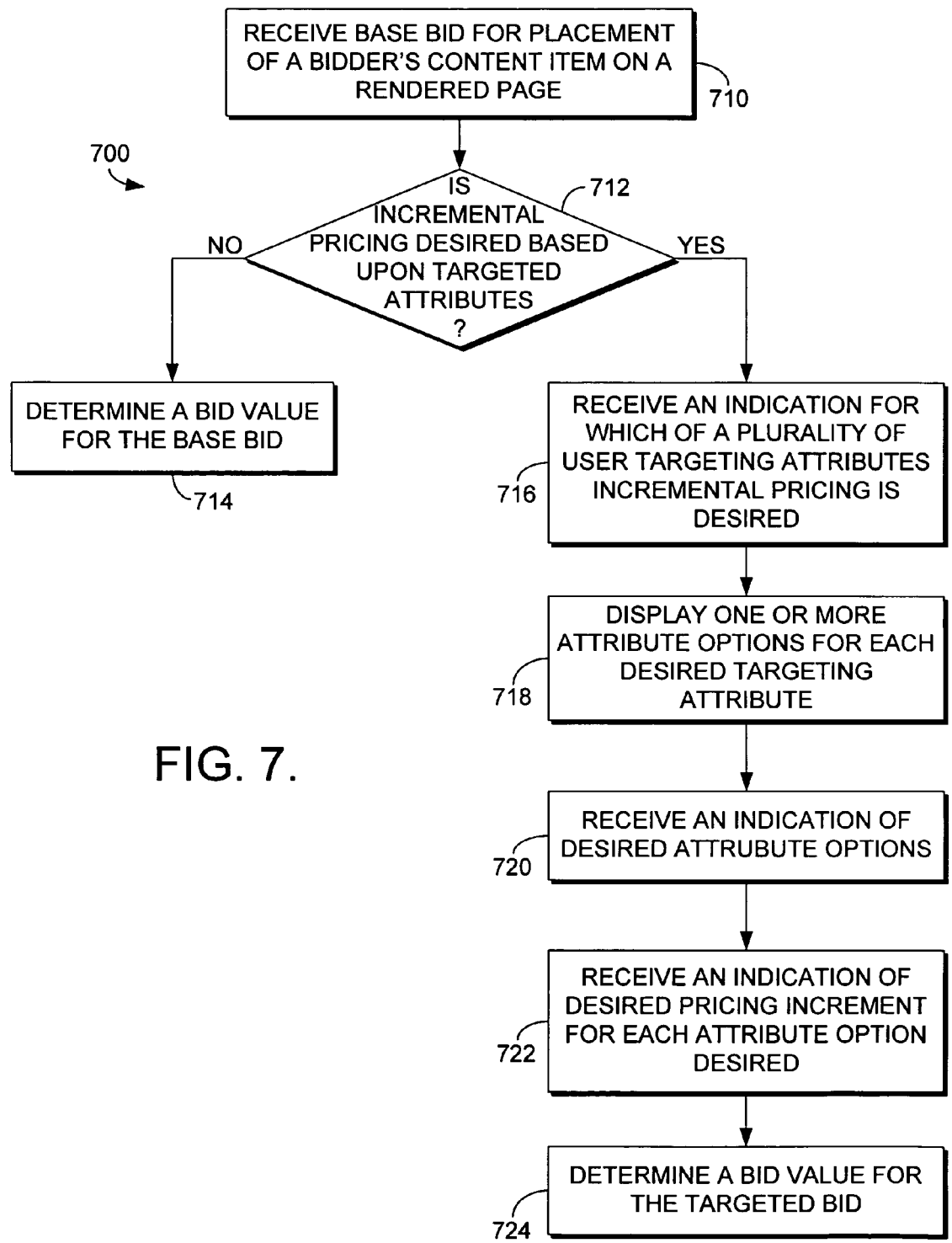
FIG. 7 is a flow diagram showing a computer-implemented method for determining bid values based upon one or more targeting attributes in accordance with an embodiment of the present invention.

With reference to FIG. 7, a flow diagram is illustrated which shows a computer-implemented method 700 for determining bid values based upon one or more targeting attributes in accordance with this embodiment of the present invention. It will be understood and appreciated by those of ordinary skill in the art that although the FIGS. and discussion of this embodiment of the present invention refer to the above-described scenario wherein a number of content providers are bidding for placement of one or more content items (e.g., advertisements or images) on a rendered page (e.g., a web page), the methods and systems herein described are equally applicable in other auction settings. The particular scenario described herein is exemplary only and is not intended to limit the present invention in any way.

Initially, as shown at block 710, the system receives a base bid for placement of a bidder's content item on a rendered page. Subsequently, it is determined whether or not incremental pricing is desired based upon targeted attributes, as shown at block 712. If incremental pricing is not desired, a bid value for the bid is determined based solely on the base bid. This is indicated at block 714. If incremental pricing is desired, however, the attributes for which pricing increments are desired, as well as the value of such pricing increments, must be determined, as more fully described below. It should be noted that use herein of the terms "increment" or "incremental" is intended to cover not only increments in pricing based upon particular attributes and/or placement positions but also pricing decrements as well for, e.g., undesirable attributes and/or positioning.

Figure 8A:
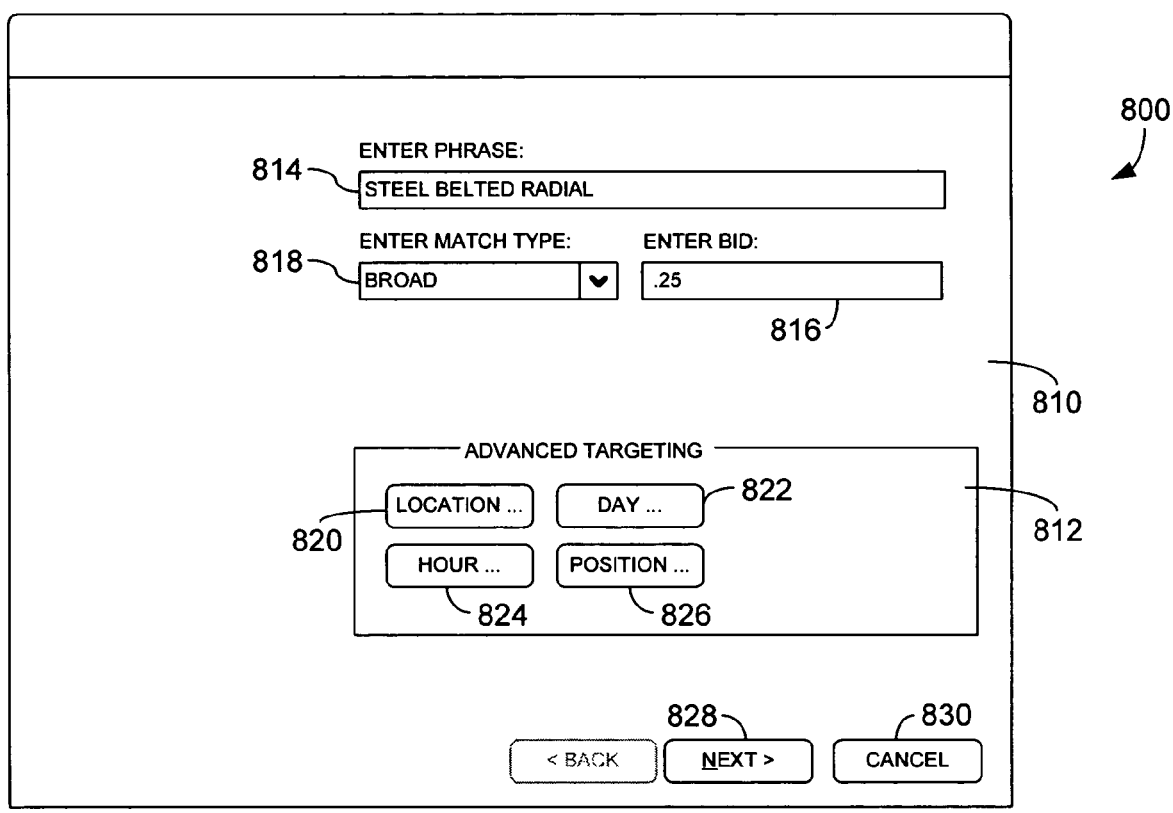
FIG. 8A is an illustrative screen display of an exemplary user interface (UI) wherein a search phrase (or bid term) and base bid may be indicated and displayed.

Referring to FIG. 8A, an illustrative screen display 800 of an exemplary user interface (UI) is shown on which such base bids (and their associated search phrases or bid terms) may be entered or selected by a bidder and displayed. It will be understood and appreciated by those of ordinary skill in the art that this is only one possible visual configuration and, accordingly, is not intended to limit the scope of the invention in any way. A number of conceivable configurations may be presented which permit the bidder (i.e., the content provider) to enter the desired information and all such variations are contemplated to be within the scope of the present invention.

Screen display 800 includes a base bid entry/display area 810 and a targeting attribute selection area 812. The base bid entry/display area 810 includes a desired search phrase entry/display area 814, a desired base bid entry/display area 816, and a desired match type indication/display area 818. The desired search phrase entry/display area 814 permits a bidder (e.g., a content provider) to enter the search phrase or bid term for which placement of a bid is desired. In the screen display 800 of FIG. 8A, the bidder has entered the search phrase "Steel Belted Radial" in the desired search phrase entry/display area 814. The desired base bid entry/display area 816 permits the bidder to enter the base bid that they wish to place for the search term or phrase entered. In the screen display 800 of FIG. 8A, the bidder has entered a base bid of $0.25 in the desired base bid entry/display area 816. The desired match type indication/display area 818 permits a bidder to indicate in which type of match the entered search term or phrase is desired to be included. A "broad" match is indicated in the desired match type indication/display area 818 of the screen display 800 of FIG. 8A.

The targeting attribute selection area 812 of the screen display 800 of FIG. 8A includes a plurality of targeting attributes for which the base bid may be incremented or decremented. For instance, the targeting attribute selection area 812 of the screen display 800 of FIG. 8A includes a user location targeting area 820, a day of the week targeting area 822, a time of day targeting area 824, and a relative placement position targeting area 826. It will be understood and appreciated by those of ordinary skill in the art that the targeting attributes shown in the screen display 800 of FIG. 8A are merely illustrative and are not intended to limit the scope of the present invention in any way.

Once the search phrase or bid term, the match type, and the base bid have been entered or selected by the bidder, if it is determined at block 712 (FIG. 7) that incremental pricing based upon targeted attributes is not desired, the bidder may simply select the "Next" indicator 828 on the exemplary screen display 800 of FIG. 8A and proceed with the determination of bid value based solely upon the base bid. As previously discussed, this is shown at block 714 of FIG. 7. It should be noted that if the bidder determines that they do not wish to proceed with placing a bid for the search phrase or bid term, they may exit the bidding system by selection of the "Cancel" indicator 830 on the exemplary screen display 800 of FIG. 8A.

Returning to FIG. 7, if it is determined at block 712 that incremental pricing based upon targeted attributes is desired, the system receives an indication for which of a plurality of user targeting attributes incremental pricing is desired. This is shown at block 716. Once a desired targeting attribute has been received, one or more attribute options for the desired targeting attribute may be displayed to the bidder, as indicated at block 718. The system may then receive an indication of the desired attribute options for which the bidder desires incremental pricing, as indicated at block 720, as well as an indication of the desired pricing increment (or decrement) for each desired attribute option, as indicated at block 722. Once all targeting attributes and their associated attribute options for which the bidder desires bid pricing adjustments have been received by the system, the bid value for the targeted bid may be determined. This is indicated at block 724.

Figure 8B:
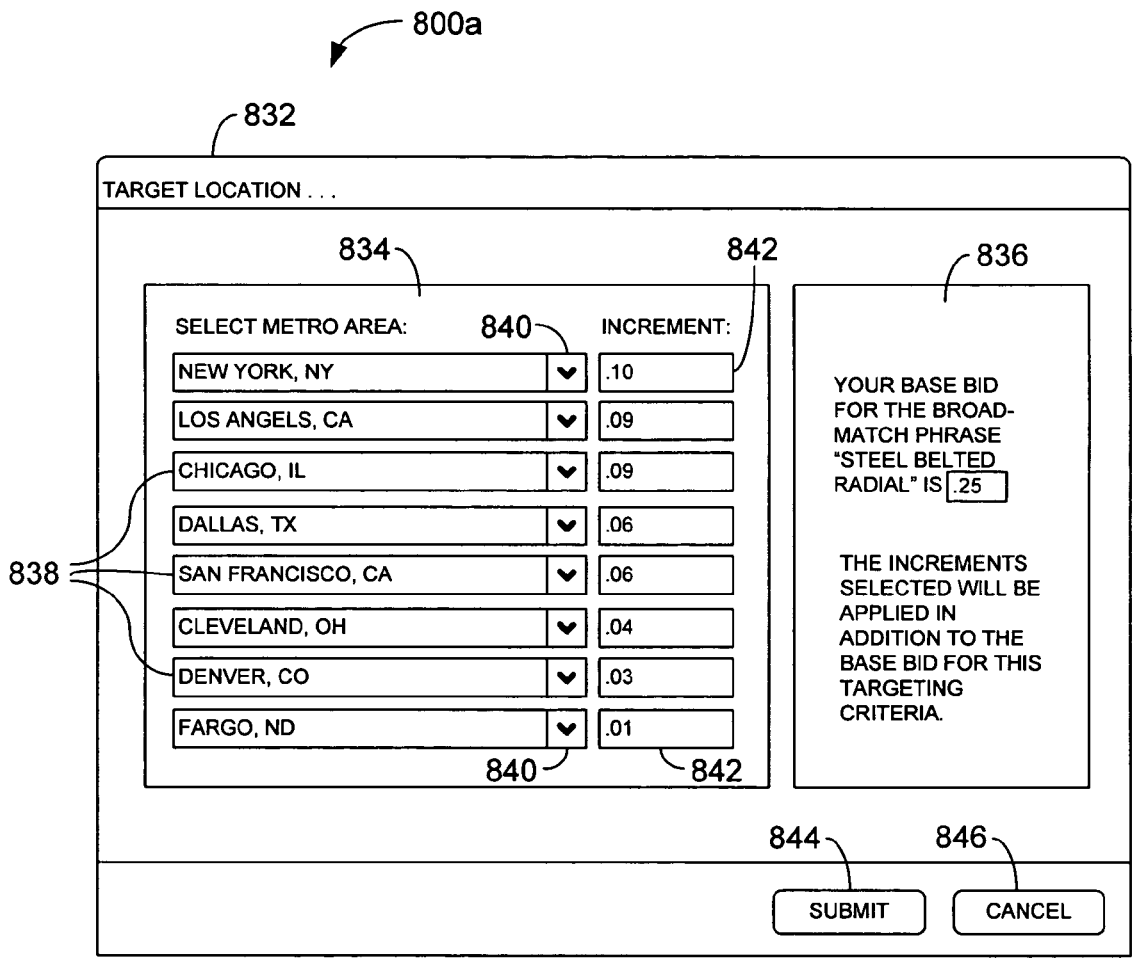
FIG. 8B is an illustrative screen display of an exemplary UI wherein targeting based upon user location may be indicated and displayed.

Returning to the exemplary screen display 800 of FIG. 8A, if the bidder desires incremental pricing based upon targeted attributes, it may select one or more of the user location targeting area 820, the day of the week targeting area 822, the time of day targeting area 824 and the relative placement position targeting area 826. If the bidder selects the user location targeting area 820, the bidder may then be presented with an additional exemplary screen display 800*a*, as shown in FIG. 8B. The exemplary screen display 800*a* of FIG. 8B includes a selected attribute display area 832, an attribute option display area 834, and a base bid display and instruction area 836. The selected attribute display area 832 indicates that the bidder has selected the user location targeting area 820 of the screen display 800 of FIG. 8A and, thus, the bidding system is providing targeted bidding options based upon user location. The base bid display and instruction area 836 indicates that the bidder indicated a base bid of $0.25 in the base bid entry/display area 816 of the screen display 800 of FIG. 8A and informs the bidder that the increments selected in the attribute option display area 834 will be applied in addition to the base bid when the indicated criteria are met, as more fully described below.

The attribute option display area 834 of the screen display 800*a* of FIG. 8B includes a plurality of attribute option slots 838 the bidder may use to increment their base bid. The down arrow 840 to the right of each of the attribute option slots 838 shown indicates that the bidder may select from a pre-defined list of options in each of the attribute option slots 838. However, it will be understood by those of ordinary skill in the art that the bidder may be permitted to enter their own options rather than selecting from a pre-defined list, if desired. The attribute option display area 834 further includes a pricing increment entry/display area 842 associated with each of the attribute option slots 838 wherein the bidder may indicate the amount of any increment (or decrement) they wish to associate with the attribute option displayed. For instance, in the top attribute option slot 838 of the attribute option display area 834 of the screen display 800*a* of FIG. 8B, the bidder has indicated that the bid will be incremented by $0.10 for each search engine user that has an Internet Protocol (IP) address in New York, N.Y.

Once the bidder has entered/selected all desired attribute options and their associated bid pricing increments within the user location targeting area 820 (FIG. 8A), the "Submit" indicator 844 may be selected, at which time the bidder will be returned to the exemplary screen display 800 of FIG. 8A. Note that at any time if the bidder determines that they do not wish to increment their bid based upon user location, the "Cancel" indicator 846 may be selected to return the bidder to the exemplary screen display 800 of FIG. 8A.

Figure 8C:
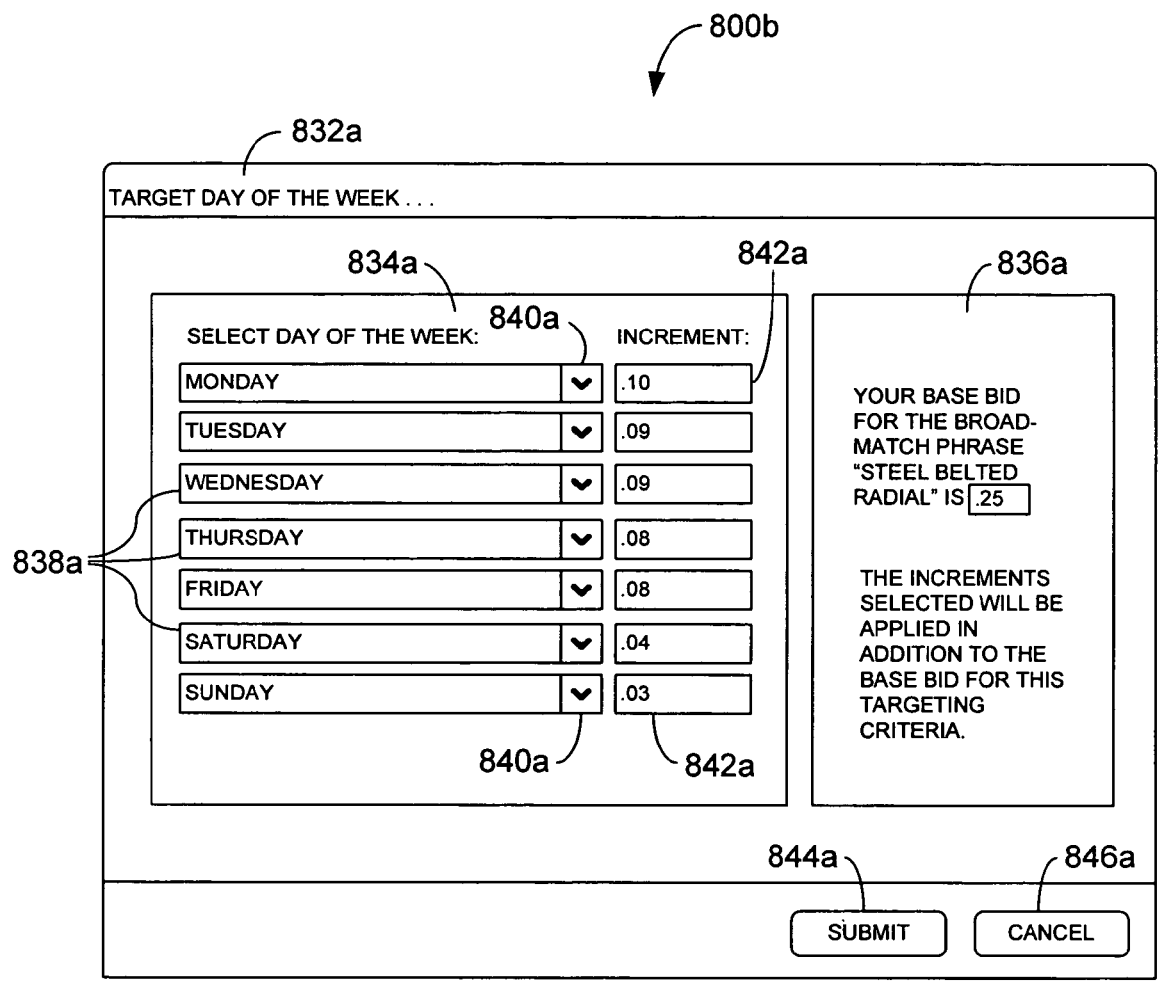
FIG. 8C is an illustrative screen display of an exemplary UI wherein targeting based upon the day of the week on which a search is being conducted may be indicated and displayed.

Once returned to the exemplary screen display 800 of FIG. 8A, the bidder may select another of the targeted attributes on which bid adjustments are desired, i.e., the day of the week targeting area 822, the time of day targeting area 824, and/or the relative placement position targeting area 826 may be selected (or the bidder may return to the user location targeting area 820, if desired). If the bidder selects the day of the week targeting area 822, the bidder may then be presented with an additional exemplary screen display 800*b*, as shown in FIG. 8C. The exemplary screen display 800*b* of FIG. 8C includes a selected attribute display area 832*a*, an attribute option display area 834*a*, and a base bid display and instruction area 836*a*. The selected attribute display area 832*a* indicates that the bidder has selected the day of the week targeting area 822 of the screen display 800 of FIG. 8A and, thus, the bidding system is providing targeted bidding options based upon the day of the week a user is placing a search query. The base bid display and instruction area 836*a* indicates that the bidder indicated a base bid of $0.25 in the base bid entry/display area 816 of the screen display 800 of FIG. 8A and informs the bidder that the increments selected in the attribute option display area 834*a* will be applied in addition to the base bid the indicated criteria are met, as more fully described below.

The attribute option display area 834*a* of the exemplary screen display 800*b* of FIG. 8C includes a plurality of attribute option slots 838*a* the bidder may use to increment their base bid. As with the attribute option display area 834 of the exemplary screen display 800*a* of FIG. 8B, a down arrow 840*a* to the right of each of the attribute option slots 838*a* indicates that the bidder may select from a pre-defined list of options in each of the attribute option slots 838*a*. However, it will be understood and appreciated by those of ordinary skill in the art that the bidder may be permitted to enter their own options rather than selecting from a pre-defined list, if desired. The attribute option display area 834*a* further includes a pricing increment entry/display area 842*a* associated with each of the attribute option slots 838*a* wherein the bidder may indicate the amount of any increment (or decrement) they wish to associate with the attribute option displayed. For instance, in the top attribute option slot 838*a* of the attribute option display area 834*a* of the screen display 800*b* of FIG. 8C, the bidder has indicated that the bid will incremented by $0.10 for each search engine user that is placing their search engine query on a Monday.

Once the bidder has entered/selected all desired attribute options and their associated bid pricing increments within the day of the week targeting area 822 (FIG. 8A), the "Submit" indicator 844*a* may be selected at which time the bidder will be returned to the exemplary screen display 800 of FIG. 8A. Note that at any time if the bidder determines that they do not wish to increment their bid based upon the day of the week, the "Cancel" indicator 846*a* may be selected to return the bidder the exemplary screen display 800 of FIG. 8A.

Figure 8D:
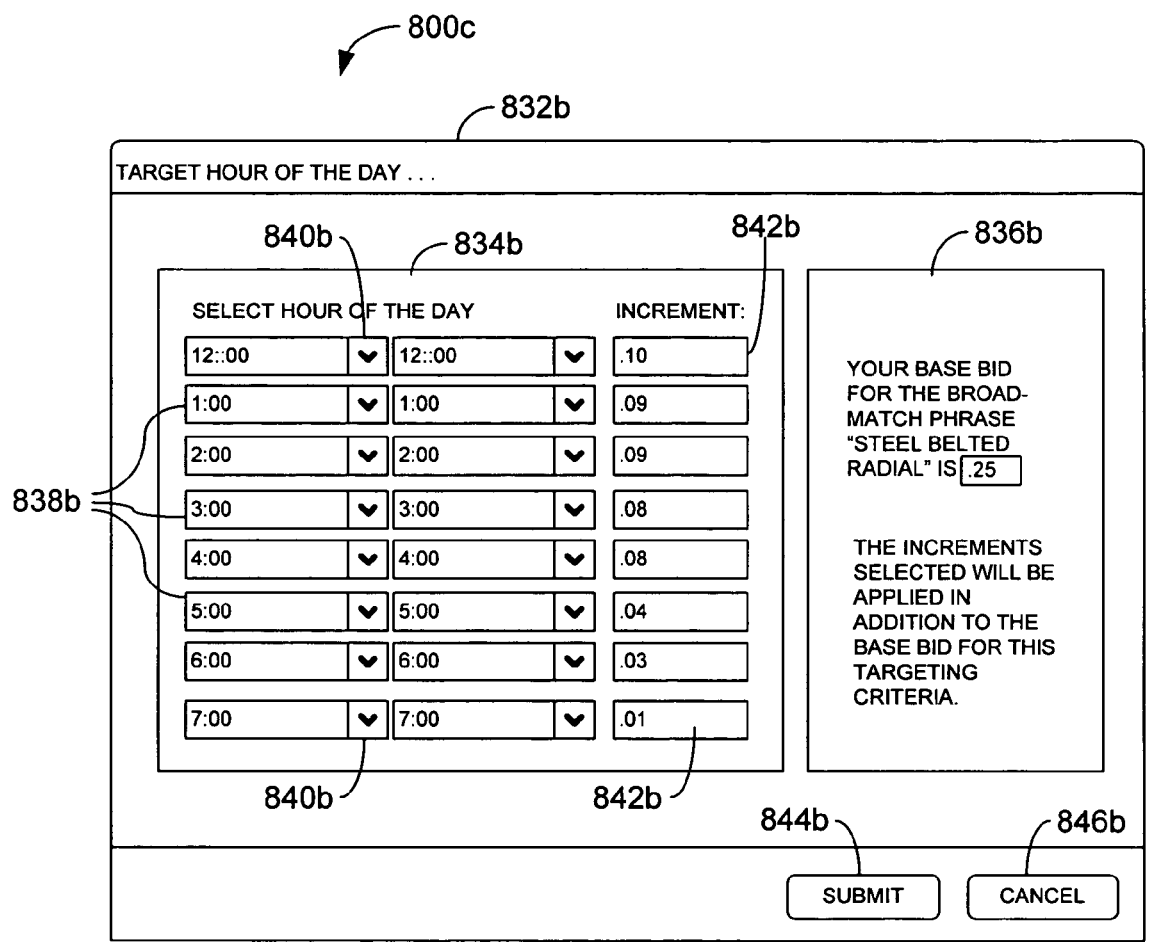
FIG. 8D is an illustrative screen display of an exemplary UI wherein targeting based upon the time of day on which a search is being conducted may be indicated and displayed.

Once returned to the exemplary screen display 800 of FIG. 8A, the bidder may select another of the targeted attributes on which bid adjustments are desired, i.e., the time of day targeting area 824 and/or the relative placement position targeting area 826 may be selected (or the bidder may return to the user location targeting area 820 or the day of the week targeting area 822, if desired). If the bidder selects the time of day targeting area 824, the bidder may then be presented with an additional exemplary screen display 800*c*, as shown in FIG. 8D. The exemplary screen display 800*c* of FIG. 8D includes a selected attribute display area 832*b*, an attribute option display area 834*b*, and a base bid display and instruction area 836*b*. The selected attribute display area 832*b* indicates that the bidder has selected the time of day targeting area 824 of the screen display 800 of FIG. 8A and, thus, the bidding system is providing targeted bidding options based upon the time of day a user is placing a search query. The base bid display and instruction area 836*b* indicates that the bidder indicated a base bid of $0.25 in the base bid entry/display area 816 of the screen display 800 of FIG. 8A and informs the bidder that the increments selected in the attribute option display area 834*b* will be applied in addition to the base bid when the indicated criteria are met, as more fully described below.

The attribute option display area 834*b* of the exemplary screen display 800*c* of FIG. 8D includes a plurality of attribute option slots 838*b* the bidder may use to increment their base bid. As with the attribute option display area 834 of the exemplary screen display 800*a* of FIG. 8B, a down arrow 840*b* to the right of each of the attribute option slots 838*b* indicates that the bidder may select from a pre-defined list of options in each of the attribute option slots 838b. However, it will be understood and appreciated by those of ordinary skill in the art that the bidder may be permitted to enter their own options rather than selecting from a pre-defined list, if desired. The attribute option display area 834b further includes a pricing increment entry/display area 842b associated with each of the attribute option slots 838b wherein the bidder may indicate the amount of any increment (or decrement) they wish to associate with the attribute option displayed. For instance, in the top attribute option slot 838b of the attribute option display area 834b of the screen display 800c of FIG. 8D, the bidder has indicated that bid will be incremented by $0.10 for each search engine user that is placing their search engine query at or about 12:00 p.m.

Once the bidder has entered/selected all attribute options and their associated bid pricing increments that are desired within the time of day targeting area 824 (FIG. 8A), it may select the "Submit" indicator 844b may be selected at which time the bidder will be returned to the exemplary screen display 800 of FIG. 8A. Note that at any time if the bidder determines that they do not wish to increment their bid based upon the time of day, the "Cancel" indicator 846b may be selected to return the bidder to the exemplary screen display 800 of FIG. 8A.

Figure 8E:
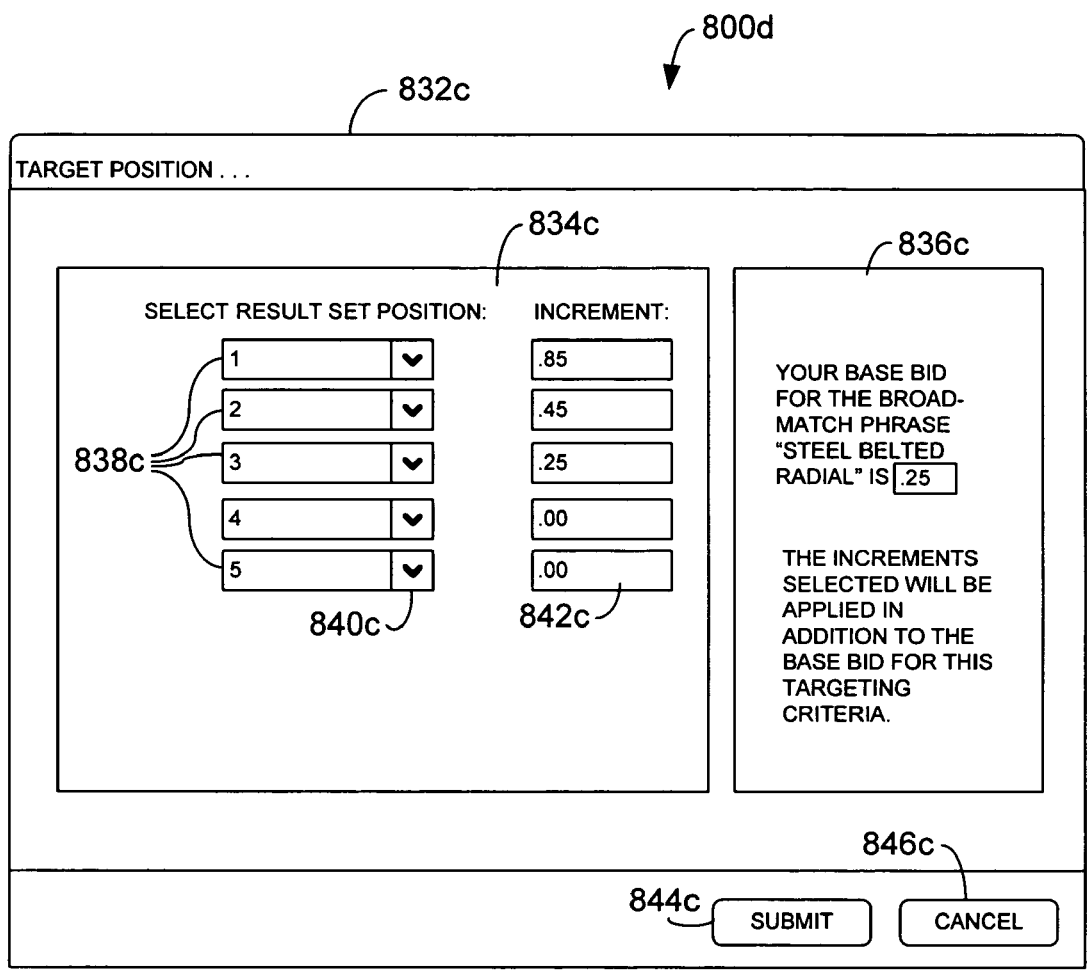
FIG. 8E is an illustrative screen display of an exemplary UI wherein targeting based upon the awarded placement position may be indicated and displayed.

Once returned to the exemplary screen display 800 of FIG. 8A, the bidder may select another of the targeted attributes on which bid adjustments are desired, i.e., the relative placement position targeting area 826 may be selected (or the bidder may return to the user location targeting area 820, the day of the week targeting area 822, or the time of day targeting area 824, if desired). If the bidder selects the relative placement position targeting area 826, the bidder may then be presented with an additional exemplary screen display 800d, as shown in FIG. 8E. The exemplary screen display 800d of FIG. 8E includes a selected attribute display area 832c, an attribute option display area 834c, and a base bid display and instruction area 836c. The selected attribute display area 832c indicates that the bidder has selected the relative placement position targeting area 826 of the screen display 800 of FIG. 8A and, thus, the bidding system is providing targeted bidding options based upon the relative placement position that may be awarded the content item associated with the bid placed. The base bid display and instruction area 836c indicates that the bidder indicated a base bid of $0.25 in the base bid entry/display area 816 of the screen display 800 of FIG. 8A and informs the bidder that the increments selected in the attribute option display area 834c will be applied in addition to the base bid when the bid placed meets the indicated criteria, as more fully described below.

The attribute option display area 834c of the exemplary screen display 800d of FIG. 8E includes a plurality of attribute option slots 838c the bidder may use to increment their base bid. As with the attribute option display area 834 of the exemplary screen display 800a of FIG. 8B, a down arrow 840c to the right of each of the attribute option slots 838c indicates that the bidder may select from a pre-defined list of options in each of the attribute option slots 838c. However, it will be understood and appreciated by those of ordinary skill in the art that the bidder may be permitted to enter their own options rather than selecting from a pre-defined list, if desired. The attribute option display area 834c further includes a pricing increment entry/display area 842c associated with each of the attribute option slots 838c wherein the bidder may indicate the amount of any increment (or decrement) they wish to associate with the attribute option displayed. For instance, in the top attribute option slot 838c of the attribute option display area 834c of the screen display 800d of FIG. 8E, the bidder has indicated that their bid will be incremented by $0.85 for placement in the prominent or most desired content item placement position.

Once the bidder has entered/selected all desired attribute options and their associated bid pricing increments within the relative placement position targeting area 826 (FIG. 8A), the "Submit" indicator 844c may be selected at which time the bidder will be returned to the exemplary screen display 800 of FIG. 8A. Note that at any time if the bidder determines that they do not wish to increment their bid based upon relative placement position of the content item, the "Cancel" indicator may be selected 846c to return the bidder to the exemplary screen display 800 of FIG. 8A.

In the exemplary screen displays 800a, 800b, 800c, and 800d, any intersection of one or more attribute options results in addition (or subtraction) of the indicated increments. For instance, if a search for the phrase "steel belted radial" ($0.25) is submitted from an Internet Protocol (IP) address in New York, N.Y. ($0.10) on Monday ($0.10) at or about 12:00 noon ($0.10) and the content item is awarded the most prominent placement position as a result of the search ($0.85), the total bid would be $1.40. From this bid, the bid value may be determined, depending upon the pricing model under which it was submitted (e.g., CPI bid, CPC bid, CPS bid, and/or revenue sharing percentage bid).

Using the method of this embodiment of the present invention, content providers may be provided with the flexibility to bid on a basic good (i.e., a search term) and then incrementally adjust their bid based upon desired attributes, e.g., the search engine user and/or the awarded placement position. The actual bid values may then be determined dynamically depending on which attribute options are satisfied.

Method for Determining Relative Placement of Content Items of Varying Shapes and Sizes In another embodiment, the present invention relates to systems and methods for determining relative placement of content items of varying shapes and sizes based upon bid value, the content items to be placed on a page (e.g., a web page) rendered according to a given context, for instance, the results of a particular query run by a search engine. In the auction scenarios hereinabove described, content providers are permitted to place bids for one or more similarly defined, although disparately located, content item positions on a page. However, such size and shape limitations are often not conducive to the content item a particular content provider wishes to place on the rendered page. For instance, a content provider may have a content item that is twice as tall as a standard content item and, accordingly, it would value two adjacent slots (one linearly atop the other), but award of a single content item position would be useless.

In one embodiment of the present invention, content providers may be permitted to bid for mixed or bundled content item positions if, e.g., the content item desired to be placed on the rendered page does not fit within the parameters of a single defined content item position. Determination of which content item positions are awarded which content items (or, more accurately, which content providers) may still be determined such that value to the hosting site (e.g., the search engine) is maximized, as more fully described below.

Figure 9:
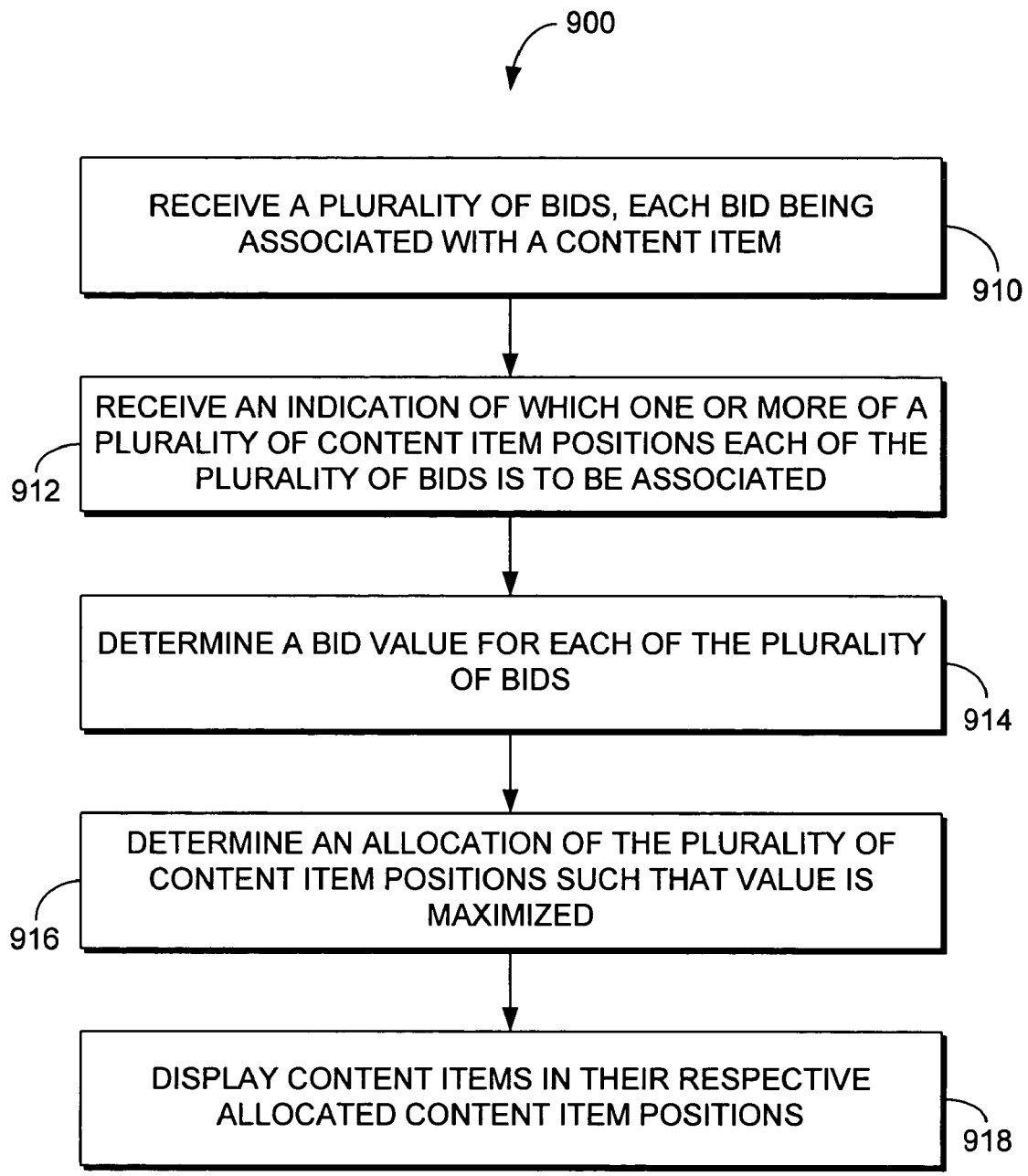
FIG. 9 is a flow diagram showing a computer-implemented method for determining relative placement of content items of varying shapes and/or sizes in accordance with an embodiment of the present invention.

Referring to FIG. 9, a flow diagram is illustrated which shows a computer-implemented method 900 for determining relative placement of content items of varying shapes and sizes in accordance with an embodiment of the present invention. Initially, as indicated at block 910, the system receives a plurality of bids, each bid being associated with a content item. Subsequently, as indicated at block 912, the system receives an indication of which one or more of a plurality of content item positions each of the plurality of bids is to be associated. Each bid received may be associated with the same content item position or combination of content item positions or the bids received may vary with regard to which content item position or positions they are to be associated.

Next, as shown at block 914, a bid value may be determined for each of the plurality of bids, if necessary. It will be understood by those of ordinary skill in the art that if all bids received were placed according to the same pricing model (e.g., the cost-per-impression pricing model, the cost-per-click pricing model, the cost-per-sale pricing model, or the revenue sharing pricing model), the bids could be considered to represent comparable value and determination of a bid value therefore may not be necessary.

It should be noted with respect to bid value determination that other criteria, for instance, an increased likelihood that a larger content item will be accessed relative to a smaller content item, may be taken into account as well, if desired.

Subsequently, as shown at block 916, the plurality of content item positions may be allocated among the content items for which bids were received such that value to the hosting site (e.g., the search engine web site) is maximized, as more fully described below. Next, as indicated at block 918, the content items may be displayed in their respective allocated content item positions.

Figure 10:
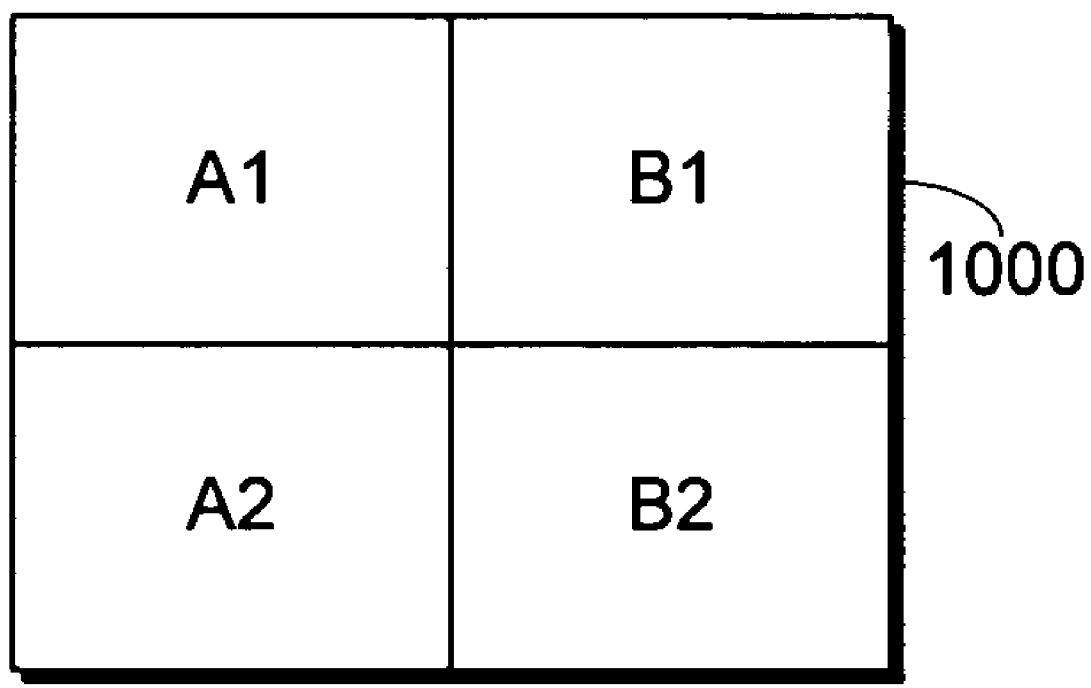
FIG. 10 is a schematic diagram showing an example in which a mixed or bundled auction methodology may be implemented in accordance with an embodiment of the present invention.

Referring to FIG. 10, a schematic diagram is shown which illustrates an example in which the bundled auction method of this embodiment of the present invention may be applied to five content providers (A, B, C, D, and E) each of which place bids for placement of their content items on a single rendered page (e.g., a web page). In this example, each of the content providers desire to have content items of varying sizes and shapes displayed on the rendered page and, accordingly, desire to bid on different combinations of available space on the page.

FIG. 10 illustrates a web-page layout 1000 in the form of grid having four content item positions (A1, A2, B1, and B2), each of which is rectangular in shape and approximately equal in size, arranged adjacent one another such that a larger overall rectangle is formed. It will be understood and appreciated by those of ordinary skill in the art that the web-page layout 1000 illustrated in FIG. 10 is merely exemplary and not intended to limit the scope of the present invention in any way. For instance, the matrix layout may be arbitrarily large. Additionally, arbitrary geometries may also be rendered (e.g., on an L, T, or gamma geometry). All such variations are contemplated to be within the scope of the present invention.

By way of example, contemplate a scenario wherein content providers A and B each wish to bid for placement of content items on the web-page layout 1000 and each have a content item which approximates the size and shape of any one of the four content item positions A1, A2, B1, and/or B2. Accordingly, content providers A and B place bids (whether identical or varying based upon position) for placement of their content items in a single content item position. It will be understood and appreciated by those of ordinary skill in the art that the bids received from each of content providers A and B may be based on any one or more of the above-described pricing models (i.e., the CPI pricing model, the CPC pricing model, the CPS pricing model, and/or the revenue share pricing model) and a bid value determined therefore, if desired.

For purposes of the present example, contemplate that content provider A values each of the available content item positions equally and places a bid for any of content item positions A1, A2, B1, or B2 having a bid value of $3.00.

Further contemplate that content provider B values content item positions A1 or B1 over content item positions A2 or B2. Accordingly, content provider B places a bid for either of positions A1 or B1 having a bid value of $4.00 and for either of A2 or B2 having a bid value of $2.00.

Further contemplate that content provider C wishes to bid for placement of a content item on the web-page layout 1000 and has a content item which approximates the size and shape of two of the content item positions positioned linearly atop one another. That is, content provider C desires to place a bid for placement of its content item such that it encompasses either the combination of positions A1 and A2 or the combination of content positions B1 and B2. Accordingly, content provider C places bids (whether identical or varying based upon which of the combinations it is awarded) for placement of its content item on the web-page layout 1000 of FIG. 10. It will again be understood by those of ordinary skill in the art that the bids received from content provider C may be based on any one or more of the above-described pricing models and a bid value determined therefore, if desired.

For purposes of the present example, contemplate that content provider C values each of the combination of content items A1 and A2 and the combination of content B1 and B2 equally and places a bid for either combination having a bid value of $7.00.

Further contemplate that content provider D wishes to bid for placement of a content item on the web-page layout 1000 and has a content item which approximates the size and shape of two of the content item positions positioned laterally aside one another. That is, content provider D desires to place a bid for placement of its content item such that it encompasses either the combination of positions A1 and B1 or the combination of content positions A2 and B2. Accordingly, content provider D places bids (whether identical or varying based upon which of the combinations it is awarded) for placement of its content item on the web-page layout 1000 of FIG. 10. It will again be understood and appreciated by those of ordinary skill in the art that the bids received from content provider D may be based on any one or more of the above-described pricing models and a bid value determined therefore, if desired.

For purposes of the present example, contemplate that content provider D values each of the combination of content items A1 and B1 and the combination of content items A2 and B2 equally and places a bid for either combination having a value of $6.00

Further contemplate that content provider E wishes to bid for placement of a content item on the web-page layout 1000 and has a content item which approximates the size and shape of all four of the content item positions arranged as they are on the web-page layout 1000. That is, content provider E desires to place a bid for placement of its content item such that it encompasses the combination of all of content item positions A1, A2, B1, and B2 and, accordingly, places a bid therefore (such bid being based upon any one or more of the above-described pricing models). For purposes of the present example, contemplate that content provider E places a bid having a value of $10.00 for the combination of all of content items A1, A2, B1, and B2.

As previously described, the allocation of content item positions to the various content providers will be determined such that value to the hosting site (e.g., the search engine web site) is maximized. Accordingly, the system of the present invention must determine which of the available combinations of space maximizes the total value and allocate the content item positions accordingly. In a first scenario, contemplate that content provider E is awarded the combination all of content item positions A1, A2, B1, and B2. As all content item positions are allocated to content provider E, content providers A, B, C, and D will not have their content items displayed in the web page layout 1000 of FIG. 10. The total value in this first scenario is the value of content provider E's bid or $10.00.

In a second scenario, contemplate that content provider D is awarded the combination of content item positions A1 and B1 (which it values at $6.00). Content items A2 and B2 remain to be allocated. As content provider E bid only on the combination of all content items, the remaining content items to be allocated are of no interest to it. Additionally, as content provider C placed bids on only the combination of content items A1 and A2 or B1 and B2, the remaining content items to be allocated are of no interest to it either. Content providers A and B placed bids on any one of the content item positions individually. Assume for purposes of this example that each content provider may be awarded only a single content item or combination of items on which it placed a bid. As such, value is maximized equally if content provider A is awarded content item A2 and content provider B is awarded content item B2 or if content provider B is awarded content item A2 and content provider A is awarded content item B2. In either instance, the value received for content items A2 and B2 is $5.00. Thus, the overall value of this second scenario is $6.00 plus $5.00 or $11.00.

In a third scenario, contemplate that content provider D is awarded the combination of content item positions A2 and B2 (which it values at $6.00). Content items A1 and B1 remain to be allocated. As content provider E bid only on the combination of all content items, the remaining content items to be allocated are of no interest to it. Additionally, as content provider C placed bids on only the combination of content items A1 and A2 or B1 and B2, the remaining content items to be allocated are of no interest to it either. Content providers A and B placed bids on any one of the content item positions individually. Since it is assumed for purposes of this example that each content provider may be awarded only a single content item or combination of items on which it placed a bid, value is maximized equally if content provider A is awarded content item A1 and content provider B is awarded content item B1 or if content provider B is awarded content item A1 and content provider A is awarded content item B1. In either instance, the value received for content items A1 and B1 is $7.00. Thus, the overall value of this third scenario is $6.00 plus $7.00 or $13.00.

In a fourth scenario, contemplate that content provider C is awarded the combination of content item positions A1 and A2 (which it values at $7.00). Content items B1 and B2 remain to be allocated. As content provider E bid only on the combination of all content items, the remaining content items to be allocated are of no interest to it. Additionally, as content provider D placed bids on only the combination of content items A1 and B1 or A2 and B2, the remaining content items to be allocated are of no interest to it either. Content providers A and B placed bids on any one of the content item positions individually. Since it is assumed for purposes of this example that each content provider may be awarded only a single content item or combination of items on which it placed a bid, value is maximized if content provider A is awarded content item B2 (which it values at $3.00) and content provider B is awarded content item B1 (which it values at $4.00). Thus, the overall value of this fourth scenario is $7.00 plus $3.00 plus $4.00 or $14.00.

In a fifth scenario, contemplate that content provider C is awarded the combination of content item positions B1 and B2 (which it values at $7.00). Content items A1 and A2 remain to be allocated. As content provider E bid only on the combination of all content items, the remaining content items to be allocated are of no interest to it. Additionally, as content provider D placed bids on only the combination of content items A1 and B1 or A2 and B2, the remaining content items to be allocated are of no interest to it either. Content providers A and B placed bids on any one of the content item positions individually. Since it is assumed for purposes of this example that each content provider may be awarded only a single content item or combination of items on which it placed a bid, value is maximized if content provider A is awarded content item A2 (which it values at $3.00) and content provider B is awarded content item A1 (which it values at $4.00). Thus, the overall value of this fifth scenario is $7.00 plus $3.00 plus $4.00 or $14.00.

In a sixth scenario, contemplate that content provider B is awarded content item A1 (which it values at $4.00). Content items A2, B1, and B2 remain to be allocated. As content provider E bid only on the combination of all content items, the remaining content items to be allocated are of no interest to it. Further contemplate that content provider D is awarded the combination of content items A2 and B2 (which it values at $6.00). Content item B1 remains to be allocated. As content provider C placed bids only on the combination of content items A1 and A2 or B1 and B2, the remaining content item is of no interest to it. Further, since it is assumed for purposes of this example that each content provider may be awarded only a single content item or combination of items on which it placed a bid, the only remaining option is to award content item B1 to content provider A (which it values at $3.00). Thus, the overall value of this sixth scenario is $4.00 plus $6.00 plus $3.00 or $13.00.

In a seventh scenario (beginning the same as the sixth scenario), contemplate that content provider B is awarded content item A1 (which it values at $4.00). Content items A2, B1, and B2 remain to be allocated. As content provider E bid only on the combination of all content items, the remaining content items to be allocated are of no interest to it. Further contemplate that content provider C is awarded the combination of content items B1 and B2 (which it values at $7.00). Content item A2 remains to be allocated. As content provider D placed bids only on the combination of content items A1 and B1 or A2 and B2, the remaining content item is of no interest to it. Further, since it is assumed for purposes of this example that each content provider may be awarded only a single content item or combination of items on which it placed a bid, the only remaining option is to award content item A2 to content provider A (which it values at $3.00). Thus, the overall value of this seventh scenario is $4.00 plus $7.00 plus $3.00 or $14.00.

In an eighth scenario, contemplate that content provider B is awarded content item A2 (which it values at $2.00). Content items A1, B1, and B2 remain to be allocated. As content provider E bid only on the combination of all content items, the remaining content items to be allocated are of no interest to it. Further contemplate that content provider D is awarded the combination of content items A1 and B1 (which it values at $6.00). Content item B2 remains to be allocated. As content provider C placed bids only on the combination of content items A1 and A2 or B1 and B2, the remaining content item is of no interest to it. Further, since it is assumed for purposes of this example that each content provider may be awarded only a single content item or combination of items on which it placed a bid, the only remaining option is to award content item B2 to content provider A (which it values at $3.00). Thus, the overall value of this eighth scenario is $2.00 plus $6.00 plus $3.00 or $11.00.

In a ninth scenario (beginning the same as the eighth scenario), contemplate that content provider B is awarded content item A2 (which it values at $2.00). Content items A1, B1, and B2 remain to be allocated. As content provider E bid only on the combination of all content items, the remaining content items to be allocated are of no interest to it. Further contemplate that content provider C is awarded the combination of content items B1 and B2 (which it values at $7.00). Content item A1 remains to be allocated. As content provider D placed bids only on the combination of content items A1 and B1 or A2 and B2, the remaining content item is of no interest to it. Further, since it is assumed for purposes of this example that each content provider may be awarded only a single content item or combination of items on which it placed a bid, the only remaining option is to award content item A1 to content provider A (which it values at $3.00). Thus, the overall value of this ninth scenario is $2.00 plus $7.00 plus $3.00 or $12.00.

In a tenth scenario, contemplate that content provider B is awarded content item B1 (which it values at $4.00). Content items A1, A2, and B2 remain to be allocated. As content provider E bid only on the combination of all content items, the remaining content items to be allocated are of no interest to it. Further contemplate that content provider D is awarded the combination of content items A2 and B2 (which it values at $6.00). Content item A1 remains to be allocated. As content provider C placed bids only on the combination of content items A1 and A2 or B1 and B2, the remaining content item is of no interest to it. Further, since it is assumed for purposes of this example that each content provider may be awarded only a single content item or combination of items on which it placed a bid, the only remaining option is to award content item A1 to content provider A (which it values at $3.00). Thus, the overall value of this tenth scenario is $4.00 plus $6.00 plus $3.00 or $13.00.

In an eleventh scenario (beginning the same as the tenth scenario), contemplate that content provider B is awarded content item B1 (which it values at $4.00). Content items A1, A2, and B2 remain to be allocated. As content provider E bid only on the combination of all content items, the remaining content items to be allocated are of no interest to it. Further contemplate that content provider C is awarded the combination of content items A1 and A2 (which it values at $7.00). Content item B2 remains to be allocated. As content provider D placed bids only on the combination of content items A1 and B1 or A2 and B2, the remaining content item is of no interest to it. Further, since it is assumed for purposes of this example that each content provider may be awarded only a single content item or combination of items on which it placed a bid, the only remaining option is to award content item B2 to content provider A (which it values at $3.00). Thus, the overall value of this eleventh scenario is $4.00 plus $7.00 plus $3.00 or $14.00.

In a twelfth scenario, contemplate that content provider A is awarded content item A1 (which it values at $3.00). Content items A2, B1, and B2 remain to be allocated. As content provider E bid only on the combination of all content items, the remaining content items to be allocated are of no interest to it. Further contemplate that content provider D is awarded the combination of content items A2 and B2 (which it values at $6.00). Content item B1 remains to be allocated. As content provider C placed bids only on the combination of content items A1 and A2 or B1 and B2, the remaining content item is of no interest to it. Further, since it is assumed for purposes of this example that each content provider may be awarded only a single content item or combination of items on which it placed a bid, the only remaining option is to award content item B1 to content provider B (which it values at $4.00). Thus, the overall value of this twelfth scenario is $3.00 plus $6.00 plus $4.00 or $13.00.

In a thirteenth scenario (beginning the same as the twelfth scenario), contemplate that content provider A is awarded content item A1 (which it values at $3.00). Content items A2, B1, and B2 remain to be allocated. As content provider E bid only on the combination of all content items, the remaining content items to be allocated are of no interest to it. Further contemplate that content provider C is awarded the combination of content items B1 and B2 (which it values at $7.00). Content item A2 remains to be allocated. As content provider D placed bids only on the combination of content items A1 and B1 or A2 and B2, the remaining content item is of no interest to it. Further, since it is assumed for purposes of this example that each content provider may be awarded only a single content item or combination of items on which it placed a bid, the only remaining option is to award content item A2 to content provider B (which it values at $2.00). Thus, the overall value of this thirteenth scenario is $3.00 plus $7.00 plus $2.00 or $12.00.

In a fourteenth scenario, contemplate that content provider A is awarded content item B1 (which it values at $3.00). Content items A1, A2, and B2 remain to be allocated. As content provider E bid only on the combination of all content items, the remaining content items to be allocated are of no interest to it. Further contemplate that content provider D is awarded the combination of content items A2 and B2 (which it values at $6.00). Content item A1 remains to be allocated. As content provider C placed bids only on the combination of content items A1 and A2 or B1 and B2, the remaining content item is of no interest to it. Further, since it is assumed for purposes of this example that each content provider may be awarded only a single content item or combination of items on which it placed a bid, the only remaining option is to award content item A1 to content provider B (which it values at $4.00). Thus, the overall value of this fourteenth scenario is $3.00 plus $6.00 plus $4.00 or $13.00.

In a fifteenth scenario (beginning the same as the fourteenth scenario), contemplate that content provider A is awarded content item B2 (which it values at $3.00). Content items A1, A2, and B1 remain to be allocated. As content provider E bid only on the combination of all content items, the remaining content items to be allocated are of no interest to it. Further contemplate that content provider C is awarded the combination of content items B1 and B2 (which it values at $7.00). Content item A2 remains to be allocated. As content provider D placed bids only on the combination of content items A1 and B1 or A2 and B2, the remaining content item is of no interest to it. Further, since it is assumed for purposes of this example that each content provider may be awarded only a single content item or combination of items on which it placed a bid, the only remaining option is to award content item A2 to content provider B (which it values at $2.00). Thus, the overall value of this fifteenth scenario is $3.00 plus $7.00 plus $2.00 or $12.00.

As can be seen from the above-described scenarios, value is maximized at $14.00 if allocation is determined in accordance with any of scenarios 4, 5, 7, or 11. As any of these scenarios will maximize value to the hosting site (e.g., the search engine web site), allocation may be determined among these scenarios according to any other criteria the hosting site so chooses, e.g., maximizing the number of content providers whose content items are shown or rewarding content providers having a long history with the hosting site.

Figure 19:
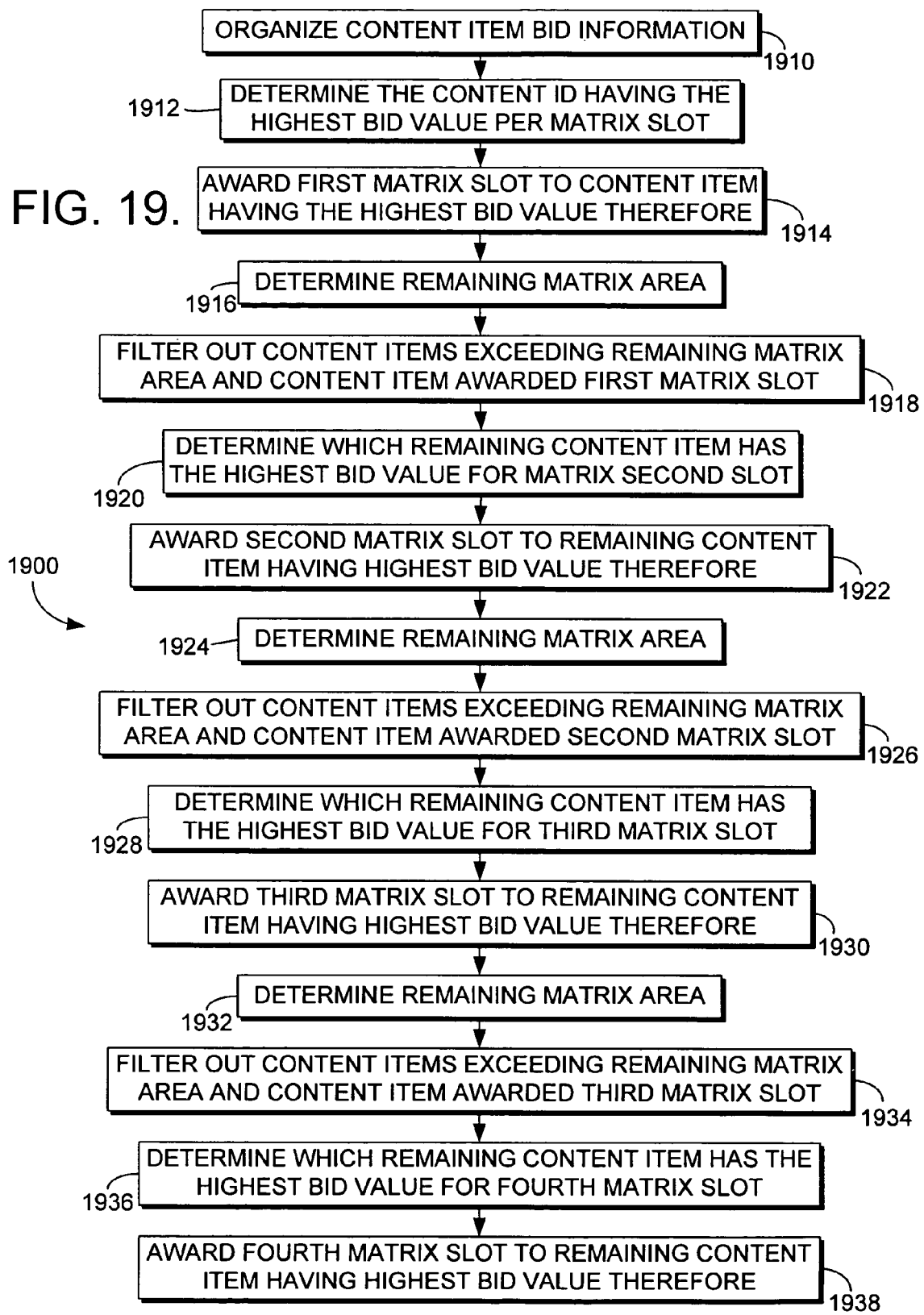
FIG. 19 is a flow diagram showing a computer-implemented method for selecting content items to be placed on a rendered page, the content items having varying shapes and/or sizes, in accordance with an embodiment of the present invention.

Selection and placement of content items in the content items positions on a rendered page (referred to herein as a "matrix") may be more generally described with reference to FIG. 19. FIG. 19 is a flow diagram showing a computer-implemented method for selecting content items to be placed in a matrix on a rendered page, the content items having varying shapes and/or sizes, in accordance with an embodiment of the present invention. Initially, as indicated at block 1910, the content items and their respective bid information may be organized such that all relevant information may be more easily evaluated. Such organization may take any number of forms known to those of ordinary skill in the art and the manner in which such organization takes place, or the form in which the organized data may be rendered, are not intended to limit the scope of the present invention.

By way of example only, contemplate the seven content providers place bids for content items to be placed in a matrix on a rendered page, the rendered page having a grid-like layout as shown in FIG. 10. As the matrix shown in FIG. 10 is two dimensional, the data may be organized in terms of the number of slots that are necessary for the content items for each of the x dimension and the y dimension. The exemplary content items and their respective bid values per slot are indicated in Table III.

TABLE III

| Content Item ID | # of X Axis Slots | # of y Axis Slots | Total $ | $ Per Slot |
|---|---|---|---|---|
| 1 | 1 | 1 | $ 3.00 | $3.00 |
| 2 | 2 | 1 | $ 6.00 | $3.00 |
| 3 | 1 | 2 | $ 7.00 | $3.50 |
| 4 | 2 | 2 | $10.00 | $2.50 |
| 5 | 1 | 2 | $ 6.00 | $3.00 |
| 6 | 1 | 1 | $ 4.00 | $4.00 |
| 7 | 1 | 1 | $ 1.00 | $1.00 |

Subsequently, as shown at block 1912, the content item having the highest bid value per matrix slot is determined for placement in the first matrix slot to be filled. In one embodiment, the slots may be filled from left to right and from top to bottom. Thus, in the matrix of FIG. 10, the first slot to which a content item will be awarded is slot A1. The content item chosen to fill slot A1 will be the slot providing the maximum value therefore. Accordingly, as $4.00 per slot for content item ID 6 provides the highest value, it will be selected for slot A1 and, accordingly, awarded position A1. This is indicated at block 1914.

Subsequently, as shown at block 1916, the remaining matrix area is determined. Next, the content items exceeding the remaining matrix area and the content item awarded the first matrix slot (i.e., content item ID 6) are filtered out of consideration, as indicated at block 1918.

Subsequently, as the slots are being filled from left to right and from top to bottom, the second slot to be filled will be slot B1. Accordingly, it is next determined which of the remaining content items provides the highest bid value for slot B1. This is indicated at block 1920. Referring back to Table III, it can be seen that content item ID 3 provides $3.50 value per slot. Since content item ID 3 requires one slot in the x dimension and two slots in the y dimension, such content item will fit within the remaining matrix area. Accordingly, as indicated at block 1922, content item ID 3 is awarded the second matrix slot (slot B1). However, as content item ID 3 fills two slots in the y dimension, it also will be awarded the third matrix slot or slot B2.

It should be noted that if content item ID 3 had filled only slot B1, in the present example, the next slot to be filled would have been slot B2. As such, the remaining matrix area would have been determined (as indicated at block 1924), the content items exceeding the remaining matrix area and the content item awarded slot B2 would have been filtered out from consideration (as indicated at block 1926), the remaining content item providing the highest bid value for slot B2 would have been determined (as indicated at block 1928) and, accordingly awarded thereto (as indicted at block 1930). However, as content item ID 3 filled both matrix slots B1 and B2, steps 1924, 1926, 1928, and 1930 of the computer-implemented method of FIG. 3 may be effectively skipped in the present example.

Subsequently, the remaining matrix area is again determined, as indicated at block 1932, content item slot A2 being the only slot which remains to be filled. The content items exceeding the remaining matrix area (that is, those content items requiring more than one slot in the x dimension and one slot in the y dimension) are filtered out of consideration as are those content items which have already been awarded to a matrix slot (i.e., content item IDs 3 and 6). This is indicated at block 1934. The remaining content item having the highest bid value for the remaining matrix slot is subsequently determined, as indicated at block 1936, and the fourth matrix slot is awarded thereto, as indicated at block 1938.

In the present example, content item ID 1 provides a value of $3.00 for the remaining slot and is, accordingly, awarded thereto. As such, the total value provided by the content items placed in the matrix in accordance with the method of FIG. 19 and the matrix of FIG. 10 is $4.00+$7.00 +$3.00 or $14.00.

Methods for Price and Position Estimation for Content Items to be Placed on a Rendered Page As previously discussed, in the prior art methods for determining relative placement of content items (e.g., advertisements and/or images) on a rendered page (e.g., a web page), content providers are unable to view the bids that are being placed by their competitors. As such, the only way that content providers can determine how their bids compare to the bids being placed by their competitors is by examining the position they are ultimately awarded in the results listing relative to other content providers as a result of an appropriate query.

The present invention relates to systems and methods for estimating the relative placement position of a particular content item based upon a proposed bid and displaying such position estimation to a content provider. Further, the present invention relates to systems and methods for estimating the value a content provider would have to bid to have a high likelihood of having its content item placed in a desired content item position and displaying the bid pricing estimation to the content provider. The estimation methods and systems of the present invention are extremely valuable to content providers as they permit content provider's to gain approximate knowledge of pricing and position information before a page is rendered according to a given context. Without this knowledge, the content providers generally have no idea what the going rate is for a set of keywords and may only be able to gather such information on their own after a long series of trial and error.

Figure 11:
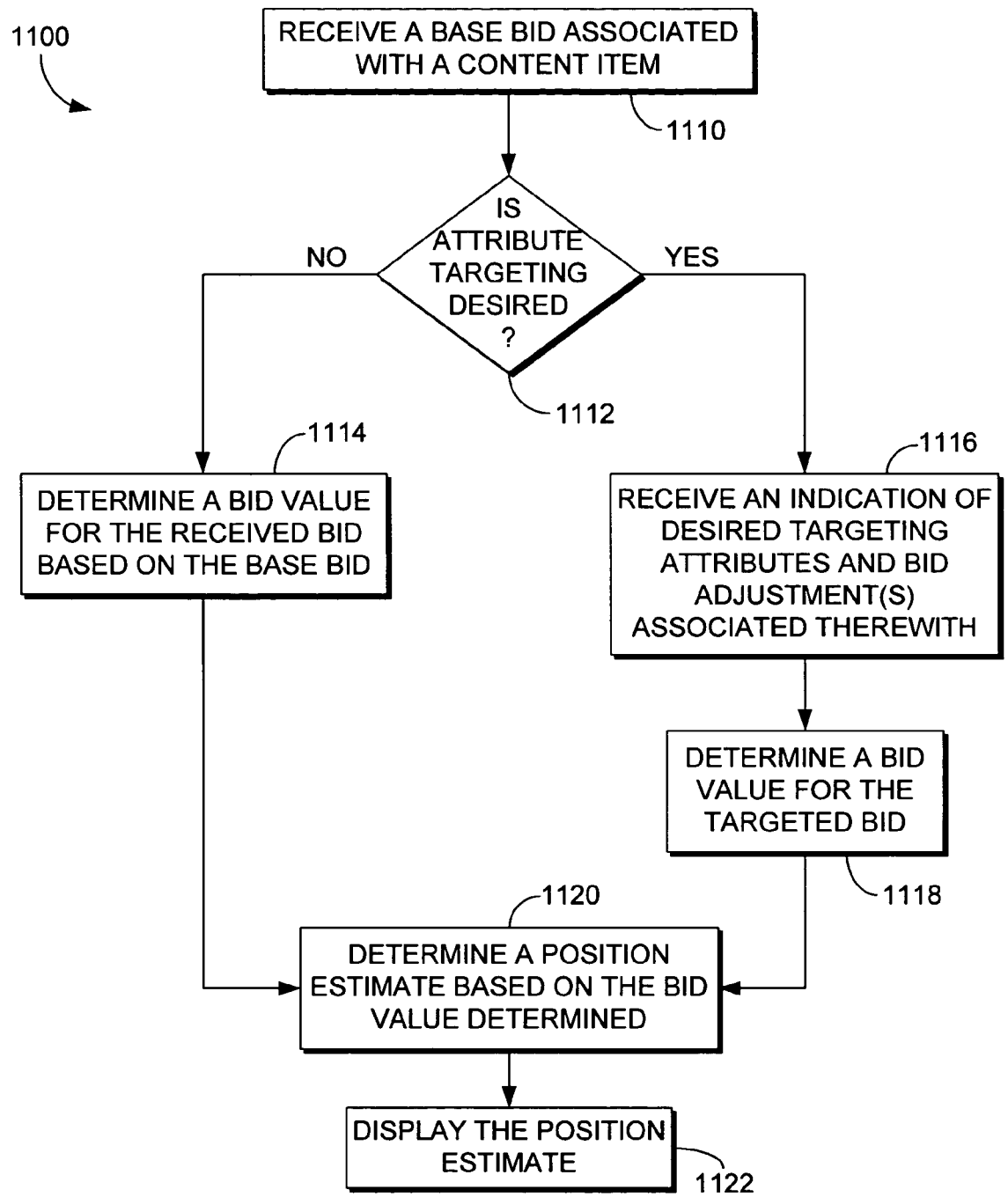
FIG. 11 is a flow diagram showing a computer-implemented method for estimating the position on a rendered page where a content item is likely to appear in accordance with an embodiment of the present invention.

With reference to FIG. 11, a flow diagram is illustrated which shows a computer-implemented method 1100 for estimating the position on a rendered page where a content item is likely to appear in accordance with an embodiment of the present invention. Initially, as shown at block 1110, the system receives a base bid for placement of a bidder's content item on a rendered page.

Figures 12, 13:
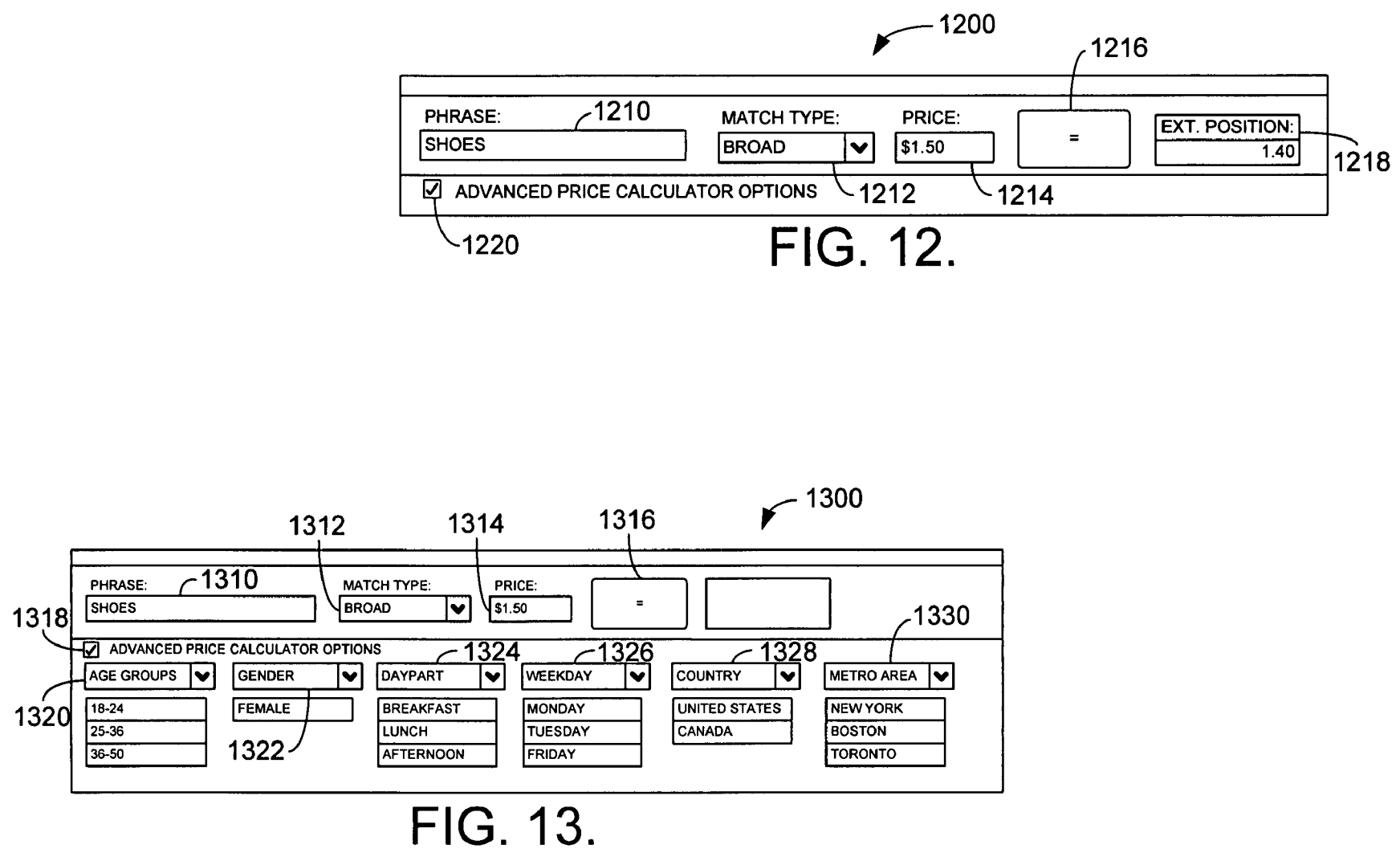

Referring to FIG. 12, an illustrative screen display 1200 of an exemplary user interface (UD) is shown on which such base bids (and their associated search phrases or bid terms and match type) may be entered or selected by a bidder and displayed. It will be understood and appreciated by those of ordinary skill in the art that this is only one possible visual configuration and, accordingly, is not intended to limit the scope of the invention in any way. A number of conceivable configurations may be presented which permit the bidder (i.e., the content provider) to enter the desired information and all such variations are contemplated to be within the scope of the present invention.

Screen display 1200 includes a search phrase entry/display area 1210, a match type indication/display area 1212, and a base bid entry/display area 1214. The search phrase entry/display area 1210 permits a bidder (e.g., a content provider) to enter the search phrase or bid term(s) for which it desires to place a bid. In screen display 1200, the bidder has entered the search phrase "Shoes". The match type indication/display area 1212 permits a bidder to indicate in which type of match it desires the entered search term(s) or phrase to be included. A "broad" match is indicated in the match type indication/display area 1212 of screen display 1200. The base bid entry/display area 1214 permits the bidder to enter the base bid for which it wishes to receive a position estimation for the combination of search term(s) or phrase entered and the indicated match type.

Referring back to FIG. 11, it is subsequently determined whether or not attribute targeting (as hereinabove described) is desired, as shown at block 1112. If attribute targeting is not desired, the system determines a bid value based solely on the base bid, as indicated at block 1114.

With reference to the screen display 1200 of FIG. 12, if attribute targeting is not desired, the bidder may select the submit indicator 1216 (having an equal sign thereon) to indicate to the system that it has entered all information it wishes to be considered in the position estimation determination. Upon such user selection, the system will determine the bid value as indicated (FIG. 11).

Returning to FIG. 11, if attribute targeting is desired, the system receives an indication from the user of the attributes for which targeting is desired, as well as an indication of the bid adjustments associated therewith. This is indicated at block 1116.

With reference again to the exemplary screen display 1200 of FIG. 12, if the bidder desires attribute targeting, it may select the advanced price calculator options area 1220 to view the attributes and attribute options based upon which it may target its bid. Once the advanced price calculator options area 1220 has been selected, the bidder may then be presented with an additional exemplary screen display 1300, as shown in FIG. 13.

The exemplary screen display 1300 includes a search phrase entry/display area 1310, a match type indication/display area 1312, and a base bid entry/display area 1314, each of which permits the same functions and includes the same information as the similarly delineated screen display areas of the screen display 1200 of FIG. 12. Screen display 1300 further includes an advanced price calculator options area 1318 that is expanded from that shown in the screen display 1200 of FIG. 12 such that it includes a number of potential targeting attribute display areas. For instance, the screen display 1300 of FIG. 13 includes an age group targeting display area 1320, a gender targeting display area 1322, a daypart targeting display area 1324, a weekday targeting display area 1326, a country targeting display area 1328, and a metro area targeting display area 1330. Beneath each of the targeting display areas is an indication of the attribute options upon which the bidder has selected targeting to be based. For instance, in the screen display 1300 of FIG. 13, the bidder has indicated in the age group targeting display area 1320 that it wishes to target the age group 18-24, the age group 25-36 and the age group 36-50.

It will be understood and appreciated by those of ordinary skill in the art that the potential targeting attribute display areas illustrated in screen display 1300, as well as the attribute options shown associated therewith, are exemplary only and are not intended to limit the scope of the present invention in any way. It will be further understood and appreciated that the down arrow to the right of each of the attribute targeting display areas indicates that upon selection thereof, the bidder may be permitted to view a predefined list of attribute options from which it may choose. Alternatively, the user may enter the information directly in the attribute targeting display area, if desired.

Once the bidder has selected each of the attributes and attribute options on which it wishes to target its bid, it may select the submit indicator 1316 (having an equal sign thereon) to indicate to the system that it has entered all information it wishes to be considered in the position estimation determination. The bidder will subsequently be returned to the screen display shown in FIG. 12.

Returning to FIG. 11, once the system has received an indication of all desired targeting attributes and attribute options, a bid value for the targeted bid is determined, as indicated at block 1118. Subsequently, the system determines a position estimate based upon the bid value determined (whether targeted or untargeted), as indicated at block 1120.

Figure 14:
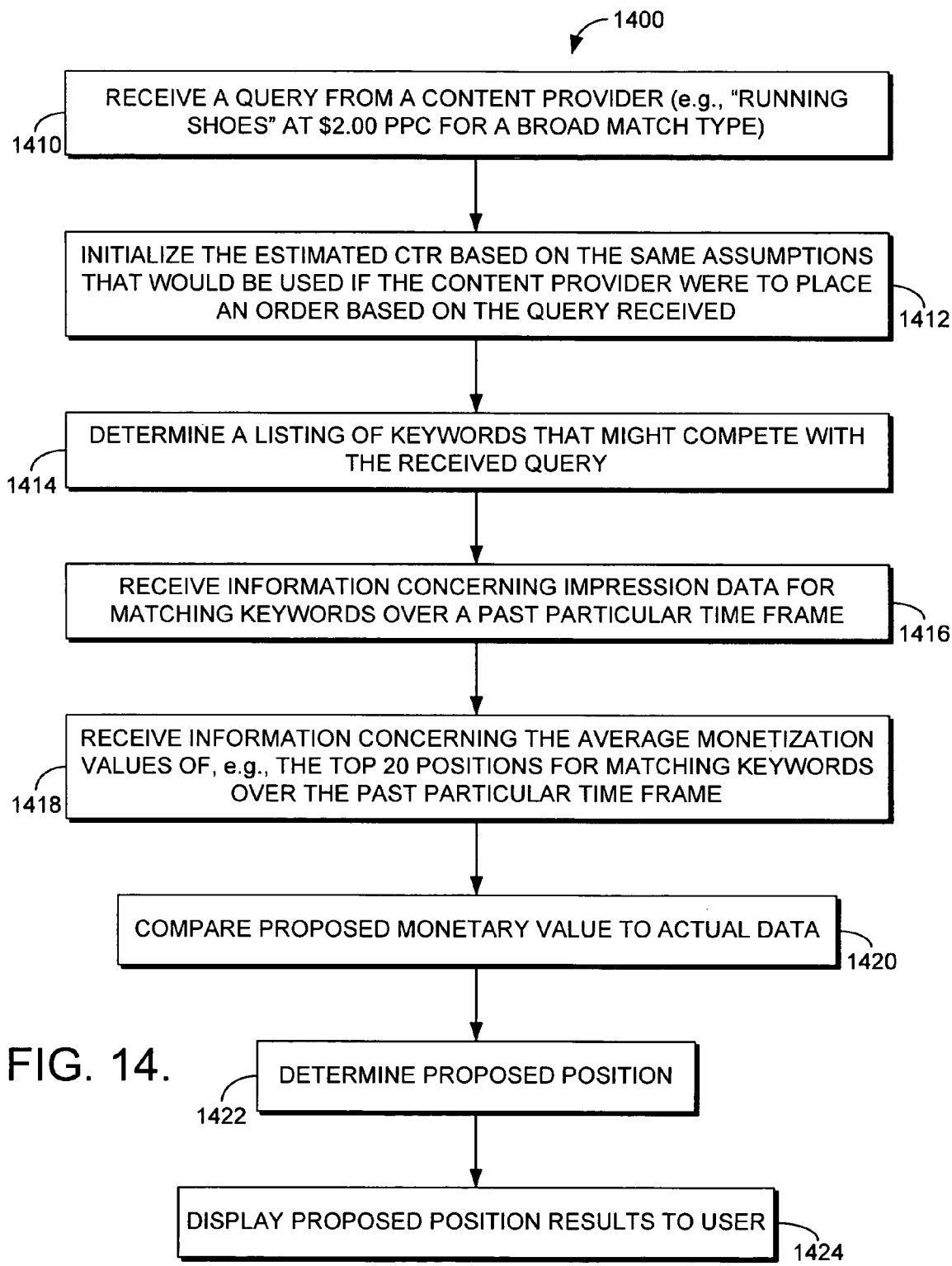
FIG. 14 is a flow diagram showing a computer-implemented method for determining a position estimate based upon a determined bid value in accordance with an embodiment of the present invention.

With reference to FIG. 14, a flow diagram is illustrated which shows a computer-implemented method 1400 for determining a position estimate based upon a determined bid value in accordance with an embodiment of the present invention. Initially, as shown at block 1410, the system receives a query from a content provider for which the content provider would like a position estimation. For instance, contemplate that a particular content provider submits a query for the bid terms "running shoes" as a cost-per-click bid of $2.00 for a broad match type.

Subsequently, as indicated at block 1412, the system initializes the estimated click-through-rate (CTR) based on the same assumptions that would be used if the content provider were to place an order based on the query received. The initial CTR may be estimated in a variety of ways, a number of which were discussed hereinabove.

Subsequently, a listing of keywords that are likely to compete with the received query is determined. This is indicated at block 1414. To accomplish this, the system initially may break the bid terms/phrases into one or more component terms/phrases (e.g., "Running", "Shoes", "Running Shoes"). Subsequently, the system may locate competing keywords, e.g., by examining the query traffic for the component terms/phrases over a past particular time frame (e.g., one month) and finding all orders matching the component terms/phrases over the time frame. Subsequently, as indicated at block 1416, the system may receive information concerning impression data for the matching component terms/phrases over the past time frame, as well as information concerning the bid values of, for instance, the top twenty positions for matching component terms/phrases over the past particular time frame. This is indicated at block 1418.

Subsequently, the system compares the proposed bid value to the actual bid value data, as indicated at block 1420, and determines a proposed estimated position. This is indicated at block 1422. This system then displays the proposed estimated position to the bidder as indicated at block 1424 of FIG. 14, as well as block 1122 of FIG. 11.

In the illustrative screen display of FIG. 12, the estimated position at which the bidder's content item is likely to be displayed is indicated in the estimated position display area 1218 of screen display 1200. In this example, it is estimated that a bid of $1.50 for the search phrase "shoes" in a broad match will permit the bidder's content item to be displayed at position 1.4.

Figure 17:
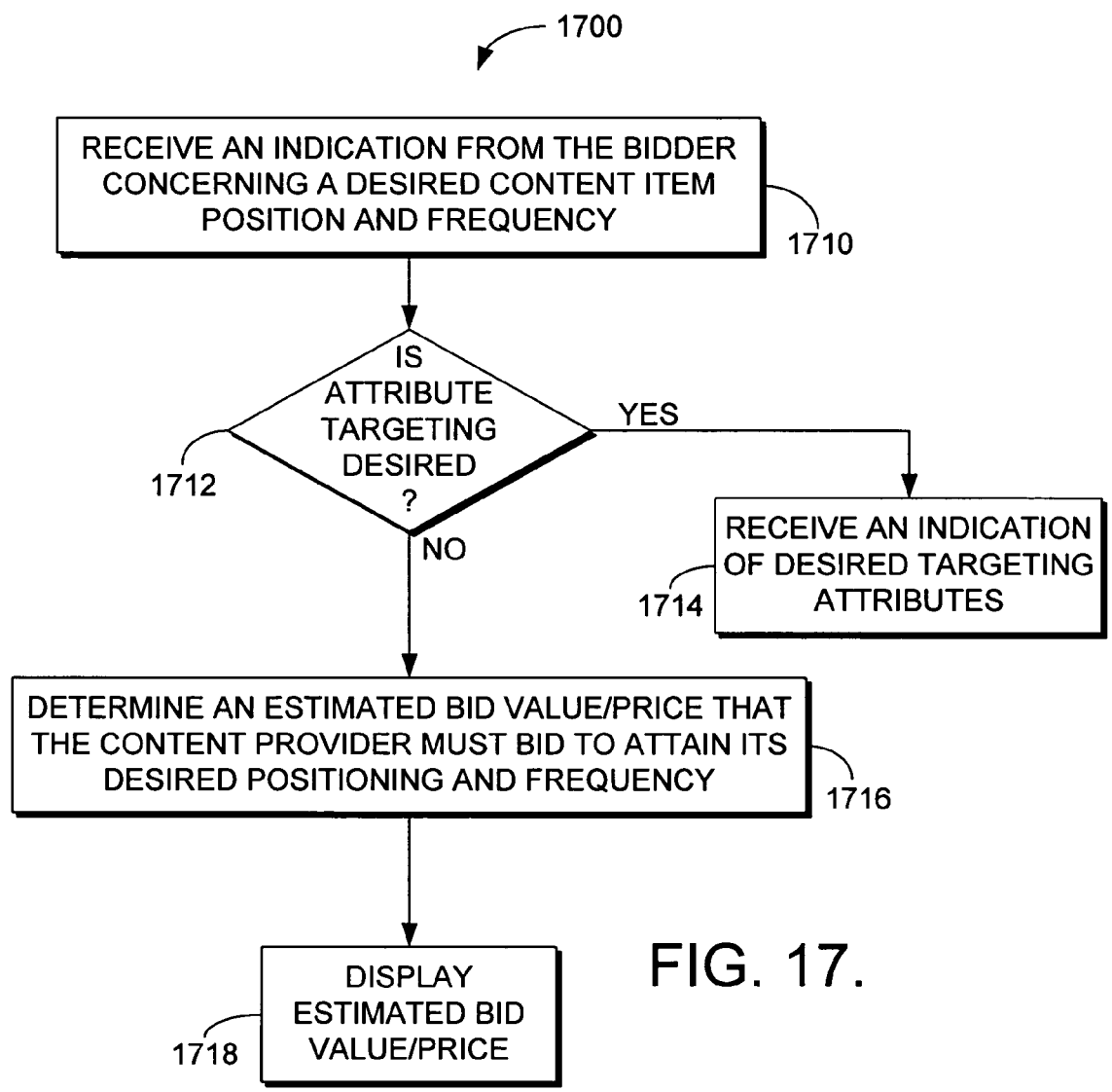
FIG. 17 is a flow diagram showing a computer-implemented method for estimating the value a content provider would have to bid to have a high likelihood of having its content item placed in a desired content item position in accordance with an embodiment of the present invention.

With reference to FIG. 17, a flow diagram is illustrated which shows a computer-implemented method 1100 for estimating the value a content provider would have to bid to have a high likelihood of having its content item placed in a desired content item position and displaying the bid value/pricing estimation to the content provider. Initially, as shown at block 1710, the system receives an indication from the bidder concerning in which position it would like its content item to appear, as well as an indication of the frequency at which it would like its content item to appear in the desired position.

Figures 15, 16:
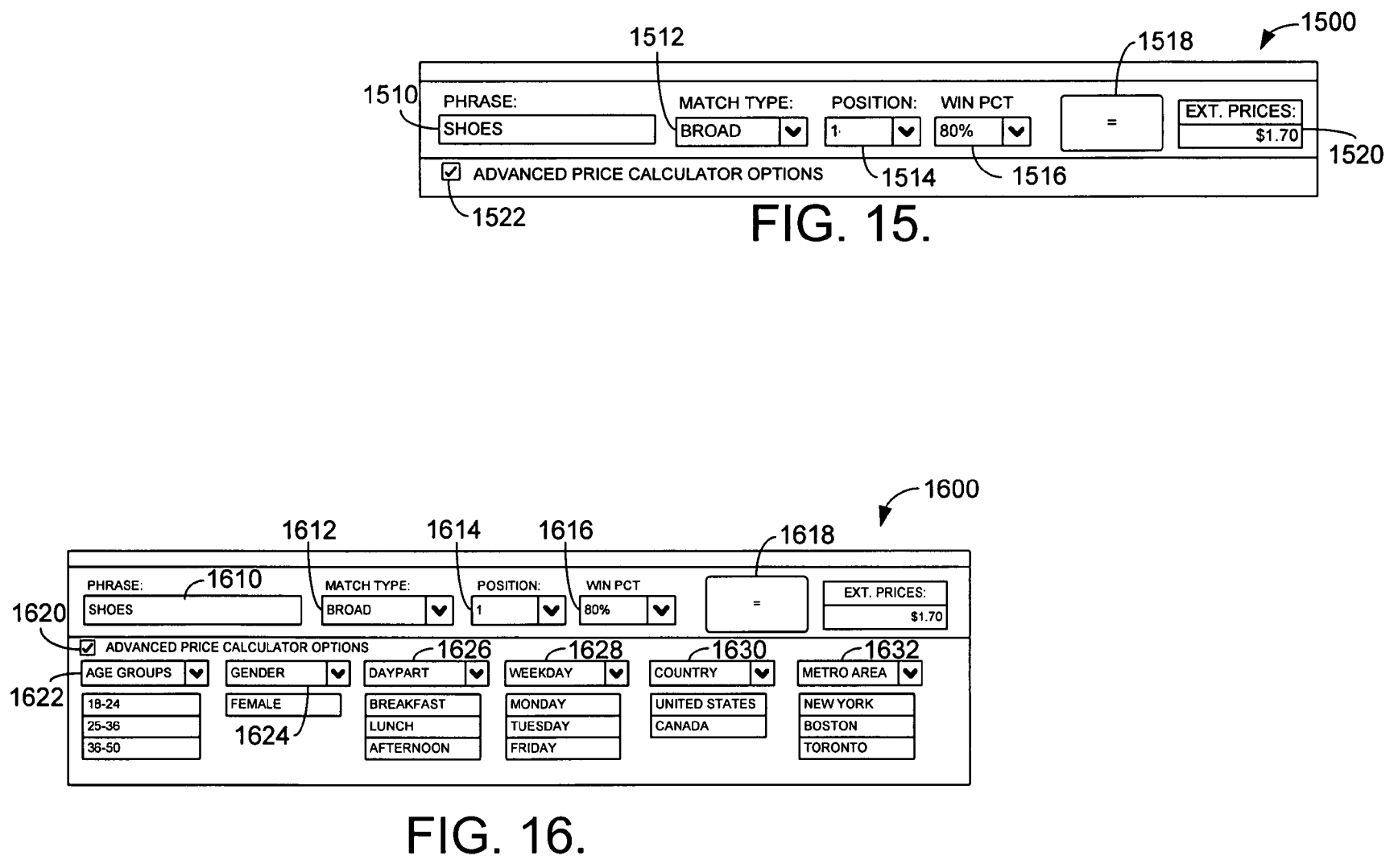

Referring to FIG. 15, an illustrative screen display 1500 of an exemplary user interface (UI) is shown on which such desired position information (and its associated search phrases or bid terms and match type) may be entered or selected by a bidder and displayed. It will be understood and appreciated by those of ordinary skill in the art that this is only one possible visual configuration and, accordingly, is not intended to limit the scope of the invention in any way. A number of conceivable configurations may be presented which permit the bidder (i.e., the content provider) to enter the desired information and all such variations are contemplated to be within the scope of the present invention.

Screen display 1500 includes a search phrase entry/display area 1510, a match type indication/display area 1512, a desired position indication area 1514, and a desired win percentage indication area 1516. The search phrase entry/display area 1510 permits a bidder (e.g., a content provider) to enter the search phrase or bid term(s) for which it desires to have its content item associated. In screen display 1500, the bidder has entered the search phrase "Shoes". The match type indication/display area 1512 permits the bidder to indicate in which type of match it desires the entered search term or phrase to be included. A "broad" match is indicated in the desired match type indication/display area 1512 of screen display 1500. The desired position indication area 1514 permits the bidder to indicate the position in which it desires its content item to be placed on the rendered page and the desired win percentage indication area 1516 permits the bidder to indicate the minimum frequency with which it would like its content item to appear in the indicated position. In screen display 1500, the bidder has indicated that it desires its content item to be placed in position 1 at least 80% of the time.

Referring back to FIG. 17, it is subsequently determined whether or not attribute targeting (as hereinabove described) is desired, as shown at block 1712. If attribute targeting is not desired, the system determines an estimated bid value/price that the content provider must bid to attain its desired positioning and frequency, as more fully described below. This is indicated at block 1716.

With reference to the screen display 1500 of FIG. 15, if attribute targeting is not desired, the bidder may select the submit indicator 1518 (having an equal sign thereon) to indicate to the system that it has entered all information it wishes to be considered in the price estimation determination.

Returning to FIG. 17, if attribute targeting is desired, the system receives an indication from the user of the attributes for which targeting is desired. This is indicated at block 1714. With reference again to the exemplary screen display 1500 of FIG. 15, if the bidder desires attribute targeting, it may select the advanced price calculator options area 1522 to view the attributes and attribute options based upon which it may target its bid. Once the advanced price calculator options area 1522 has been selected, the bidder may then be presented with an additional exemplary screen display 1600, as shown in FIG. 16.

The exemplary screen display 1600 includes a search phrase entry/display area 1610, a match type indication/display area 1612, a desired position indication area 1614, and a desired win percentage indication area 1616, each of which permits the same functions and includes the same information as the similarly delineated screen display areas of the screen display 1500 of FIG. 15. Screen display 1600 further includes an advanced price calculator options area 1620 that is expanded from that shown in the screen display 1500 of FIG. 15 such that it includes a number of potential targeting attribute display areas. For instance, the screen display 1600 of FIG. 16 includes an age group targeting display area 1622, a gender targeting display area 1624, a daypart targeting display area 1626, a weekday targeting display area 1628, a country targeting display area 1630, and a metro area targeting display area 1632. Beneath each of the targeting display areas is an indication of the attribute options upon which the bidder has selected targeting to be based. For instance, in the screen display 1600 of FIG. 16, the bidder has indicated in the weekday targeting display area 1628 that it wishes to target the weekdays Monday, Tuesday, and Friday.

It will be understood and appreciated by those of ordinary skill in the art that the potential targeting attribute display areas illustrated in screen display 1600, as well as the attribute options shown associated therewith, are exemplary only and are not intended to limit the scope of the present invention in any way. It will be further understood and appreciated that the down arrow to the right of each of the attribute targeting display areas indicates that upon selection thereof, the bidder may be permitted to view a predefined list of attribute options from which it may choose. Alternatively, the user may enter the information directly in the attribute targeting display area, if desired.

Once the bidder has selected each of the attributes and attribute options on which it wishes its bid value/pricing estimate to be based, it may select the submit indicator 1618 (having an equal sign thereon) to indicate to the system that it has entered all information it wishes to be considered in the pricing estimation determination. The bidder will subsequently be returned to the screen display shown in FIG. 15. Subsequently, returning to FIG. 17, the system determines an estimated bid value/price that the content provider must bid to attain its desired positioning and frequency, as indicated at block 1716.

Figure 18:
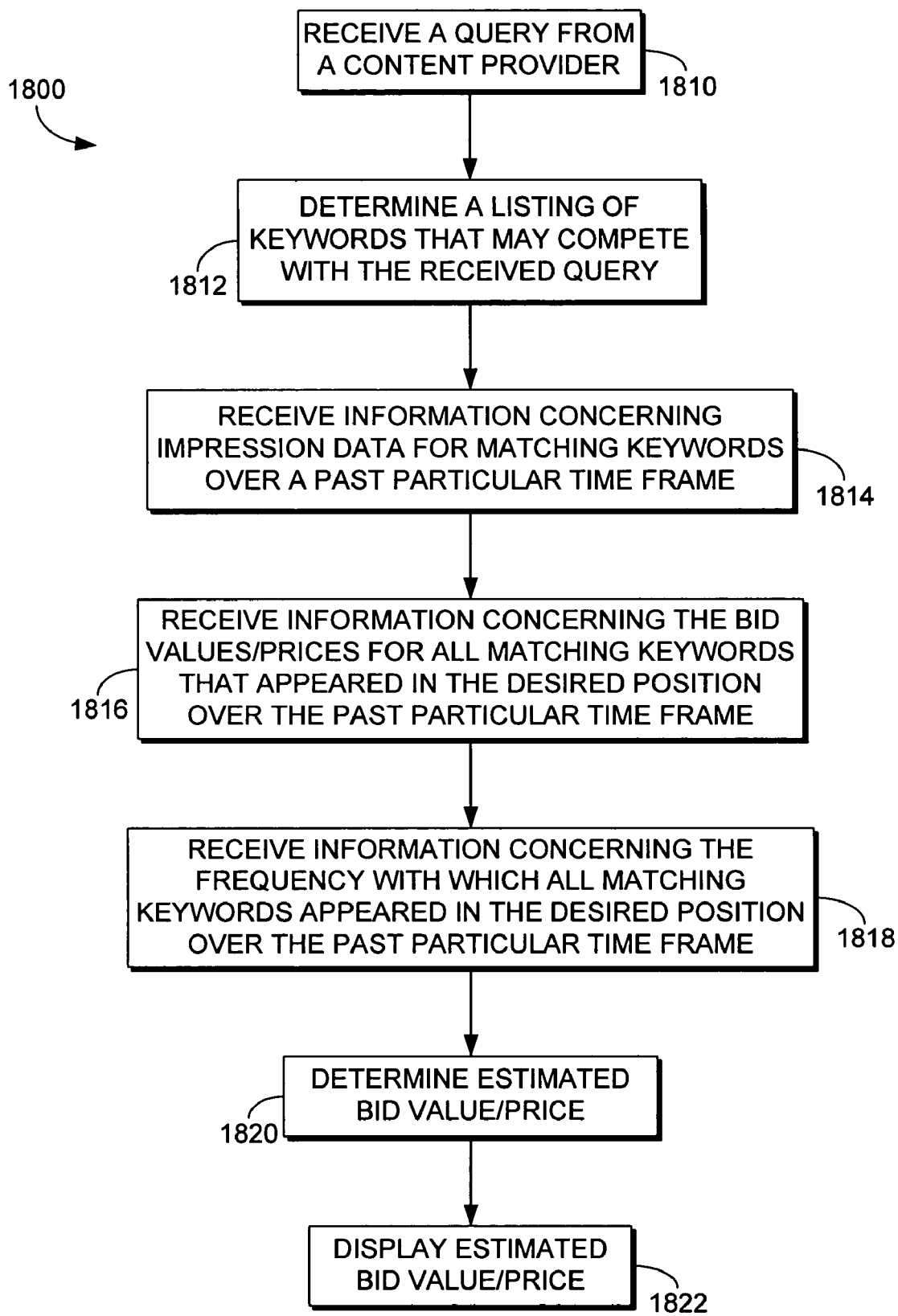
FIG. 18 is a flow diagram showing a computer-implemented method for determining a bid value/pricing estimate based upon a desired content item position and frequency in accordance with an embodiment of the present invention.

With reference to FIG. 18, a flow diagram is illustrated which shows a computer-implemented method 1800 for determining a bid value/pricing estimate based upon a desired content item position and frequency in accordance with an embodiment of the present invention. Initially, as shown at block 1810, the system receives a query from a content provider for which the content provider would like a bid value/price estimation. For instance, contemplate that a particular content provider submits a query for the bid terms "running shoes" for position 1, 80% of the time, for a broad match type.

Subsequently, as indicated at block 1812, the system determines a listing of keywords that are likely to compete with the received query. To accomplish this, the system initially may break the bid terms/phrases into one or more component terms/phrases (e.g., "Running", "Shoes", "Running Shoes"). Subsequently, the system may locate competing keywords, e.g., by examining the query traffic for the component terms/phrases over a past particular time frame (e.g., one month)

and finding all orders matching the component terms/phrases over the past time frame. Subsequently, as indicated at block 1814, the system may receive information concerning impression data for the matching component terms/phrases over the past time frame, as well as information concerning the bid values for, e.g., all matching keywords that appeared in the desired position over the past particular time frame (as indicated at block 1816) and information concerning the frequency with which all matching keywords appeared in the desired position over the past particular time frame (as indicated at block 1818).

Subsequently, the system determines a proposed bid value/price estimation, as indicated at block 1820, and displays the proposed bid value/price estimation to the bidder. This is indicated at block 1822 of FIG. 18, as well as block 1718 of FIG. 17.

In the illustrative screen display 1500 of FIG. 15, the proposed bid value/price estimation is indicated in the estimated bid value/price display area 1520. In this example, it is estimated that a bid of $1.70 for the search phrase "shoes" in a broad match will permit the bidder's content item to be displayed in position 1 about 80% of the time.

As can be understood, the present invention provides systems and methods for determining the placement of content items, e.g., advertisements and/or images, on a rendered page, e.g., a web page, relative to other content displayed on the page. Further, the present invention relates to systems and methods for determining relative placement of content items based upon bid value. Bid values may be measured in terms of dollars paid to a hosting web site, e.g., a search engine web site, there being various different pricing models that may be mixed together in a principled manner to rank content descriptors according to value. Such pricing models may differ among content items or with regard to a single content item as its performance is evaluated over time. One such pricing model is a cost-per-click (CPC) pricing model under which a bid value may be determined by multiplying a CPC bid by the click-through-rate. The present invention further relates to systems and methods for estimating click-through-rate based, in part, upon observed data.

The present invention further provides systems and methods for introducing randomness into the relative placement of content items based upon bid value. Additionally, the present invention provides systems and methods for determining bid values based upon one or more targeting attributes for which a bidder may desire to place an incrementally different bid. Further, the present invention provides systems and methods for determining the relative placement of content items of varying shapes and sizes based upon bid value. The present invention further provides systems and methods for estimating the relative placement position of a particular content item based upon a proposed bid and displaying such position estimate to a content provider. Additionally, the present invention provides systems and methods for estimating the value a content provider would have to bid to have a high likelihood of having its content item placed in a desired content item position and displaying the bid value/pricing estimate to the content provider.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

What is claimed is:

1. A computer-implemented method for determining bid values for content items to be placed on a page rendered according to a given context, comprising:
    receiving at a search engine accommodated on a computer a plurality of bids each associated with a content item, at least one of the plurality of bids being based upon a plurality of pricing models, wherein at least one of the plurality of pricing models is different from at least one other of the plurality of pricing models;
    accepting one or more bids, of the plurality of bids, for consideration from those content providers, of the plurality of content providers, having a reliable expected sales rate with the search engine;
    utilizing a processing unit included in the computer to determine a bid value for each of the accepted one or more bids, wherein each bid value is determined, at least in part, utilizing an estimated probability of selection;
    comparing each of the accepted one or more bids against each other based upon the respective determined bid values to determine a comprehensive ranking;
    displaying on a monitor one or more of the content items based upon the determined comprehensive ranking;
    collecting user access data associated with the displayed one or more content items;
    utilizing the processing unit to determine that a sufficient amount of user access data is collected to confidently predict the expected sales rate for at least one bid, of the plurality of bids;
    graduating a content provider submitting the at least one bid to accept each bid received therefrom;
    utilizing the processing unit to determine that an insufficient amount of user access data is collected to confidently predict the expected sales rate for at least one other bid, of the plurality of bids;
    disallowing from consideration the at least one other bid, of the plurality of bids from a content provider; and
    storing a graduated status in association with the content provider upon determining the at least one bid collected the sufficient amount of user access data or a disallowed status in association with the content provider upon determining the at least one other bid collected the insufficient amount of user access data.

2. The computer-implemented method of claim 1, further comprising selecting at least one of the content items based upon the respective determined bid values, wherein displaying the one or more content items based upon the determined comprehensive ranking- comprises displaying the at least one selected content item.

3. The computer-implemented method of claim 1, wherein receiving a plurality of bids comprises receiving the at least one of the plurality of bids through an auction.

4. The computer-implemented method of claim 1, wherein the given context is determined based upon a search query.

5. The computer-implemented method of claim 1, further comprising receiving information about a user, wherein the given context is determined, in part, based upon the user information received.

6. The computer-implemented method of claim 1, wherein the content items include information relevant to the given context.

7. The computer-implemented method of claim 1, wherein the at least one of the plurality of pricing models comprises at least one of a cost-per-impression pricing model, a cost-per-click pricing model, a cost-per-sale pricing model, and a revenue sharing pricing model.

8. The computer-implemented method of claim 7, further comprising collecting user access data for at least one of the displayed content items.

9. The computer-implemented method of claim 8, wherein the at least one of the pricing models upon which the at least one of the plurality of bids is based is capable of changing over time based upon the user access data collected.

10. The computer-implemented method of claim 9, wherein the at least one of the plurality of bids is based the cost-per-impression pricing model at a first instance in time and at least one of the cost-per-click pricing model, the cost-per-sale pricing model, and the revenue sharing pricing model at a second instance in time later than the first instance.

11. The computer-implemented method of claim 9, wherein the at least one of the plurality of bids is based upon one of the cost-per-impression pricing model and the cost-per-click pricing model at a first instance in time and the cost-per-sale pricing model at a second instance in time later than the first instance.

12. The computer-implemented method of claim 7, wherein the plurality of bids are based upon a plurality of pricing models, the plurality of pricing models comprising at least a cost-per-impression pricing model, a cost-per-click pricing model, a cost-per-sale pricing model, and a revenue sharing pricing model, and wherein the method further comprises adjusting the at least one of the plurality of bids based upon risk.

13. The computer-implemented method of claim 12, wherein the method further comprising confining the at least one of the plurality of pricing models upon which at least one of the plurality of bids is based to a cost-per-impression pricing model.

14. The computer-implemented method of claim 13, wherein the method of adjusting the at least one of the plurality of bids based upon risk further comprising:
determining an aggregate click-through-rate associated with the at least one of the displayed content items; and
allowing, based on the aggregate click-through-rate, the at least one of the plurality of bids, associated with the at least one of the displayed content items, confined to the cost-per-impression pricing model to be based upon at least another of the plurality of pricing models.

15. The computer-implemented method of claim 14, wherein the aggregate click-through-rate is based upon the collected user access data associated with the at least one of the displayed content items.

16. The computer-implemented method of claim 13, wherein adjusting the at least one of the plurality of bids based upon risk further comprises appending a risk penalty to the at least one of the plurality of bids, the risk penalty being based upon a quantity of the collected user access data associated with the at least one of the displayed content items that is associated with the at least one of the plurality of bids.

17. The computer-implemented method of claim 1, wherein confidently predicting the expected sales rate for the at least one bid comprises determining a reliable click-through-rate (CTR) estimate for the at least one bid based on the collected user-access data.

* * * * *